US008606796B2

(12) United States Patent
Martin et al.

(10) Patent No.: US 8,606,796 B2
(45) Date of Patent: Dec. 10, 2013

(54) METHOD AND SYSTEM FOR CREATING A DATA PROFILE ENGINE, TOOL CREATION ENGINES AND PRODUCT INTERFACES FOR IDENTIFYING AND ANALYZING FILES AND SECTIONS OF FILES

(75) Inventors: Kingsley Martin, Minneapolis, MN (US); Tracy S. Liggett, Rosemount, MN (US)

(73) Assignee: Kilac, LLC, Minneapolis, MN (US)

( * ) Notice: Subject to any disclaimer, the term of this patent is extended or adjusted under 35 U.S.C. 154(b) by 449 days.

(21) Appl. No.: 12/560,358

(22) Filed: Sep. 15, 2009

(65) Prior Publication Data

US 2010/0191748 A1 Jul. 29, 2010

Related U.S. Application Data

(60) Provisional application No. 61/097,033, filed on Sep. 15, 2008.

(51) Int. Cl.
*G06F 17/30* (2006.01)

(52) U.S. Cl.
USPC ............. 707/750; 704/2; 704/9; 715/255; 707/783; 707/771

(58) Field of Classification Search
USPC ............. 707/805, 999.201, 783, 771, 50; 715/259, 273, 255, 230; 704/2, 9; 706/52, 14, 12
See application file for complete search history.

(56) References Cited

U.S. PATENT DOCUMENTS

| | | | | |
|---|---|---|---|---|
| 4,299,578 A * | 11/1981 | Wayman | ........................ | 434/177 |
| 4,813,010 A * | 3/1989 | Okamoto et al. | ............. | 715/259 |
| 6,233,545 B1 * | 5/2001 | Datig | ................. | 704/2 |
| 6,868,411 B2 * | 3/2005 | Shanahan | ........................ | 706/52 |
| 7,023,365 B1 * | 4/2006 | Mitchell et al. | .................. | 341/67 |
| 7,137,065 B1 * | 11/2006 | Huang et al. | .................. | 715/205 |
| 7,519,607 B2 * | 4/2009 | Anderson, IV | ........................ | 1/1 |
| 7,676,501 B2 * | 3/2010 | Wilson | .................... | 707/999.201 |
| 7,870,079 B2 * | 1/2011 | McGovern et al. | ........... | 705/321 |
| 7,974,478 B2 * | 7/2011 | Bashyam et al. | ............. | 382/232 |
| 8,005,877 B2 * | 8/2011 | McDonald | .................... | 707/805 |
| 8,280,892 B2 * | 10/2012 | Marvit et al. | ................. | 707/749 |
| 2003/0078899 A1 * | 4/2003 | Shanahan | ........................ | 706/8 |
| 2004/0102958 A1 * | 5/2004 | Anderson, IV | .................... | 704/4 |
| 2006/0224584 A1 * | 10/2006 | Price | .................................. | 707/6 |
| 2007/0130123 A1 * | 6/2007 | Majumder | ........................ | 707/3 |
| 2008/0027747 A1 * | 1/2008 | McGovern et al. | ................ | 705/1 |
| 2008/0256040 A1 * | 10/2008 | Sundaresan et al. | .............. | 707/3 |
| 2009/0094020 A1 * | 4/2009 | Marvit et al. | ..................... | 704/9 |
| 2009/0094231 A1 * | 4/2009 | Marvit et al. | ..................... | 707/5 |
| 2009/0094233 A1 * | 4/2009 | Marvit et al. | ..................... | 707/5 |
| 2009/0228777 A1 * | 9/2009 | Henry et al. | .................. | 715/230 |

* cited by examiner

*Primary Examiner* — Jean M Corrielus
(74) *Attorney, Agent, or Firm* — Fenwick & West LLP

(57) ABSTRACT

A data profile engine identifies, classifies, analyzes, searches, compares and cross-references entire files and sections of files, records and other forms of electronic media, and a tool creation engine in combination with the data profile engine builds custom solutions and product interfaces.

23 Claims, 9 Drawing Sheets

FIG. 6

Resume Sections (frequency)

Objective (very frequent)
Experience (very frequent)
Education (very frequent)
Clubs and Affiliations (very frequent)
Other Interests (frequent)
Contact Information (very frequent)

Template - Outline

FIG. 8

Template - Index

| | |
|---|---|
| + | A ( Accelerate Debt - Availability of Eurodollar rate loans ) |
| + | B ( Books and Records - Books and Records ) |
| + | C ( Casualties or Condemnations - COUNTERPARTS ) |
| − | D (Defaults under Other Agreements ~ Disclosure) |

| 42 | ADMINISTRATIVE COVENANTS<br>  Certificates: Other Information<br>  Defaults or Events of Default |
|---|---|
| 43 | EVENTS OF DEFAULT<br>  Events of Default<br>  Defaults under Other Agreements |
| 44 | AFFIRMATIVE COVENANTS<br>  Certificates: Other Information<br>  Defaults under Other Indebtedness |
| 45 | DEFINITIONS<br>  DEFINED TERMS |
| 46 | DEFINITIONS |
| 47 | THE ADMINISTRATIVE AGENT<br>  Delegation of Duties |
| 48 | REPRESENTATIONS AND WARRANTIES<br>  Disclosure |

| | |
|---|---|
| + | E ( Electronic Communications - Expenses; Indemnity; Damage Waiver ) |
| + | F (Financial Condition - FURTHER ASSURANCES ) |
| + | G (Giving Notice - Governing Law ) |
| + | H ( Indebtedness - HEADINGS ) |
| + | I ( INDEMNIFICATION BY THE BORROWER - Investments ) |
| + | J ( LABOR MATTERS - Judgments ) |
| + | L ( Lending Installations - Loan Documents ) |
| + | M ( Making the Term Loans - MISCELLANEOUS ) |
| + | N ( New Subsidieries - Notices ) |

METHOD AND SYSTEM FOR CREATING A DATA PROFILE ENGINE, TOOL CREATION ENGINES AND PRODUCT INTERFACES FOR IDENTIFYING AND ANALYZING FILES AND SECTIONS OF FILES

CROSS-REFERENCE TO RELATED APPLICATION

This application relates to U.S. Provisional Application Ser. No. 61/097,033, filed Sep. 15, 2008, and entitled "Method for Creating a Data Profile Engine, Tool Creation Engines and Product Interfaces for Identifying and Analyzing Files and Sections of Files," which is herein incorporated by reference in its entirety.

FIELD OF THE INVENTION

A data profile engine for identifying, classifying, analyzing, searching, comparing and cross-referencing entire files and sections of files, records and other forms of electronic media is provided. A tool creation engine is also provided in combination with the data profile engine for building custom solutions and product interfaces.

BACKGROUND

Search and classification systems are measured by their precision (the ability to find only relevant materials) and their recall (their ability to find all relevant documents). However, the variability of language, including synonymy (different words describe the same idea) and polysemy (words having two or more meaning) limit the accuracy of current search engines. The result is that researchers may not find all useful material or may have to review volumes of search results in order to find useful material. Moreover, current search engines are limited in their capacity to accurately find a particular section from a certain type of document.

In addition to finding and classifying materials, a number of industries and service sectors rely upon standard documents and forms to ensure quality and accuracy of their documents. A number of industries have manually constructed and maintained professional document standards and templates. For example, the American Institute of Architects (AIA) and the American Society of Landscape Architects (ASLA) maintain standard building and planning specifications. In the legal field, the International Swaps and Derivatives Association (ISDA) provides standard master documents for complex financing. Templates also exist for project management, software development, and many other professional practices. Currently, in order to generate a standard template, experts must read and review numerous documents, manually create the outline and identify standard text associated with each section and alternative examples of each. Due to the breadth, complexity and expense of the process, standard documents are not broadly available for all professional documents.

SUMMARY

In view of the aspects described above, provided herein is a data profile engine that captures the "digital signature"—or characteristics of electronic media and their component elements. The textual characteristics of text blocks, together with hierarchical relationship information of the blocks to each other enables new tools to be created for accurate text search, classification and data mining.

In certain embodiments, a method for identifying a relationship between a plurality of data files comprising word text, which may be implemented in a data profile engine. The method includes receiving at a processor the plurality of data files from one or more computer databases; deconstructing the data files into one or more text blocks; creating a data profile for each data file and for the one or more text blocks associated with each data file, each data profile comprising a statistical signature for a set of data forming the corresponding data file or text block compared to the plurality of data files; and storing the data profiles on the one or more computer databases.

In another implementation, a tool creation engine may be provided, which is based on the data profile engine, and generates document standards and templates. Accordingly, a system for analyzing a document comprising text is provided, and may be considered a template and/or benchmarking tool. In this implementation, a processor is configured to receive the document and perform the steps of deconstructing the document into one or more text blocks; creating a data profile for each of the one or more text blocks, each data profile comprising a statistical signature for a set of data forming the text block; and comparing the data profile for each of the one or more text blocks with a template stored on a computer database, the template comprising data profiles for matching text blocks from a source set of documents; and a user interface is coupled to the processor for displaying an indication of similarity of the document compared to the template, the indication of similarity comprising statistical measure of frequency for matching text blocks.

In yet another implementation, a system for preparing a document comprising text is provided, which may be configured as a document drafting and reuse tool. In this implementation, a processor is configured to receive the document and perform the steps of: deconstructing document into one or more text blocks; creating a data profile for each of the one or more text blocks, each data profile comprising a statistical signature of a set of data forming the text block; and comparing the data profile for each of the one or more text blocks with data profiles associated with a model document stored on a computer database, the model document comprising a plurality of statistically similar text blocks from a source set of model documents; and a user interface coupled to the processor is for displaying default standard clauses, alternative clauses and infrequently used clauses based on the source set of model documents.

In another implementation, a system for searching entire files and sections of files provides a processor configured to receive a plurality of documents and perform the steps of deconstructing the plurality of documents into one or more text blocks; creating a data profile for each of the one or more text blocks, each data profile comprising a statistical signature of a set of data forming the text block; and comparing the data profile for each of the one or more text blocks with data profiles associated with a model document stored on a computer database, the model document comprising a plurality of statistically similar text blocks from a source set of model documents. The system additionally includes a user interface coupled to the processor for entering a search, the search comprising search terms, sections captions and/or text of a similar section of a user document compared to the model document, as well as a display for displaying the search results.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 6 depicts a resume structure.

FIG. 8 depicts a template index view.

DETAILED DESCRIPTION 1.1. Data Profile Engine

The data profile engine analyzes multiple source files (e.g., electronic media including documents and records), identifies sections of text in each file (a "text block"), matches text blocks within a file and across all files by constructing collections of matched text blocks (a "text block group") resulting in multiple sets of text block groups (a "text block group set"), and building a statistical signature of each text block, text block group, and text block group set, identifying their common and distinguishing attributes (a "data profile").

The data profile captures information including related text blocks, text block groups, and text block group sets, captions, alternative captions, document levels, text block sequences, parent-sibling-and-child relationships, words, and word weights, word match scores for each text blocks and its sub-blocks, and its word clusters. An example of a data profile is attached in Exhibit 5. Data profiles are created for the document as a whole and its text blocks. The data profile can then be used to match similar text blocks and organize entire file into common framework.

Figure 1:
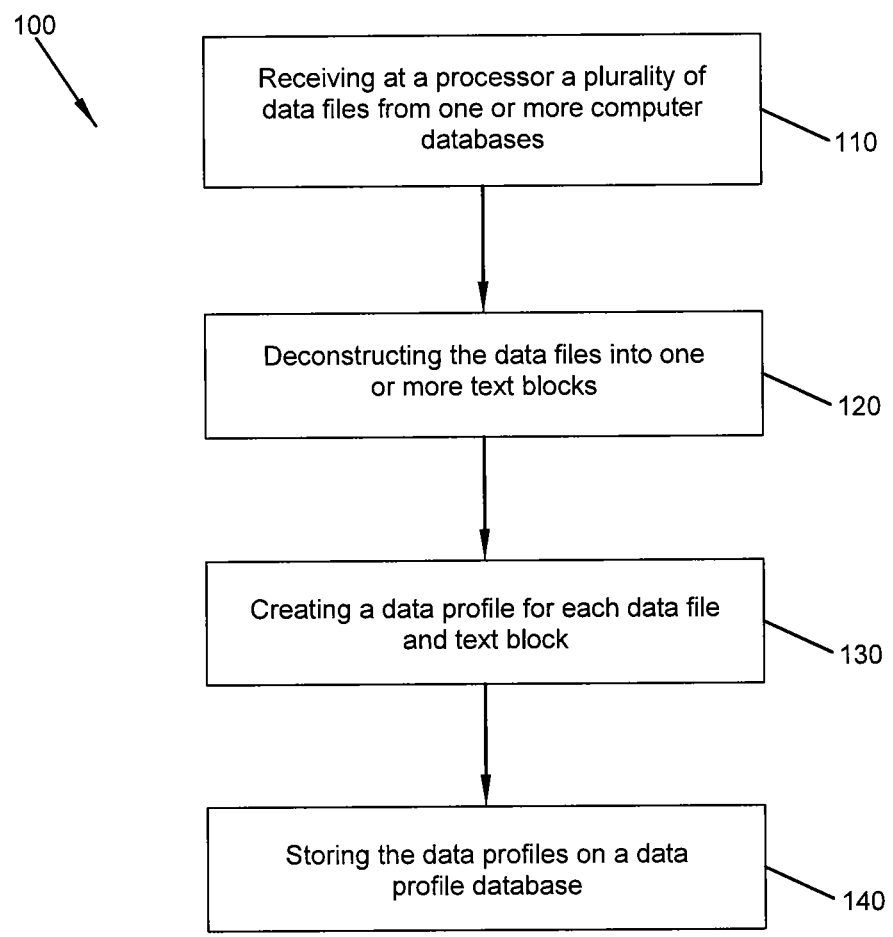
FIG. 1 depicts a method for identifying a relationship between a number of data files including word text.

FIG. 1 depicts a method 100 for identifying a relationship between a number of data files including word text, which may be implemented by a data profile engine. The method involves receiving at a processor the plurality of data files from one or more computer databases (operation 110). The received data files are deconstructed into one or more text blocks (operation 120). For each data file and text block, a data profile is created, which is a statistical signature for a set of data forming the corresponding data file or text block as compared to the plurality of data files (operation 130). The data profiles may be stored on a data profile database (operation 140), and may be subsequently used in connection with the tool creation engine.

1.2. Tool Creation Engine and Product Interfaces

The tool creation engine utilizes the data profile engine and its data profiles to facilitate the creation of a wide range software tools to analyze collections of files or individuals files; performing services such as document organization, research, reuse and validation. An example of a tool creation engine is a document template engine that uses the data profiles of a text block group set to construct an aggregated document outline based on the content and structure of all compared documents. The aggregated outline can be applied to user selected documents, or any part of a document to decompose, classify, extract meta-data, benchmark, search, mark-up common language, identify important document specific language, identify default provisions, and group results by common attributes. Product interfaces are used to render the results of these tools in a human readable fashion and can be adapted to different user domains (e.g. architecture, banking, resumes, law, or general use).

2. Description of the Embodiments 2.1. Data Profile Engine

The data profile engine operates in either an untrained or unsupervised mode of operation, or it may be configured to utilize information in existing data profile. In the untrained mode, the engine starts with no pre-existing data and constructs data profiles using configurable settings and formulas. Using the initial settings and formulas, engine builds information regarding the source set of documents to identify more and more detailed and variant statistical signatures, or data profiles, for text blocks appearing the source file set and thereby the types of files represented by its domain area. Using this approach the data profile engine may build and continue to refine knowledge of legal agreements, architecture specifications, resumes or any other type of document.

2.1.1. Core Concepts (1) Entities (a) Words (Word Universe)

The word universe index is a word statistical index containing word frequencies, word weights, and statistical information including: minimum value, maximum value, mean value, median value and deviation. It is generated from a large set of sample documents and is used to measure commonality, mean and divergence in a broad set of documents compared to the word occurrences in specific documents, and word occurrences in specific text blocks.

(b) Text Blocks

Figure 2A:
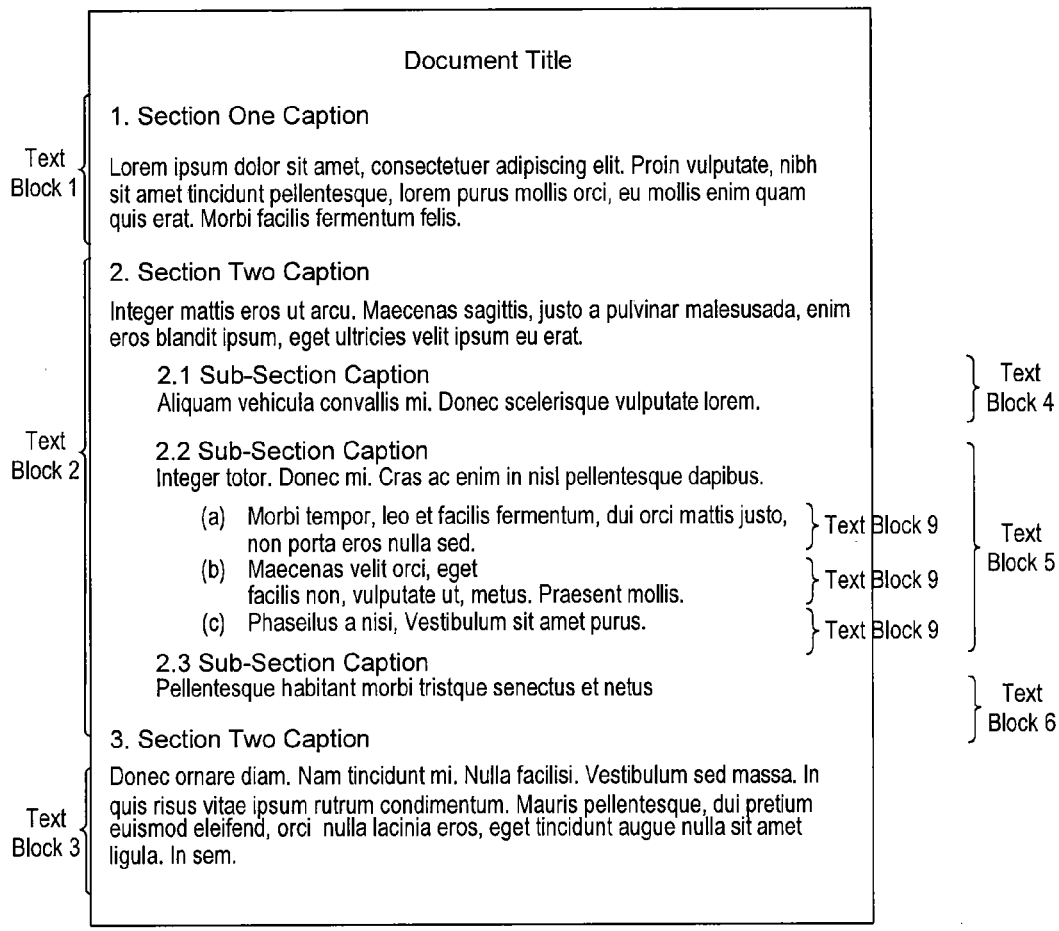
FIG. 2A depicts text blocks in a sample document according to certain implementations.

A text block is a section of words from a file. It may consist of an entire file, many paragraphs, a single paragraph or even a singe word. Depending on the type of source documents, text blocks may be organized at a single level or they may be hierarchically nested (i.e. a text block may contain other text blocks), as shown in FIG. 2A.

In a hierarchical domain of documents, text blocks can be grouped in a hierarchy recording their sequence and level. In FIG. 2A, text blocks 1, 2 and 3 are examples of level 1 and incorporate the characteristics of the nested text blocks within its scope. Text blocks 4, 5, and 6 are examples of level 2 text blocks nested within text block 2. Text blocks 7, 8 and 9 are examples of level 3 text blocks nested within text block 5. The sequence of each text block follows the order in the document; the hierarchical level provides information regarding the depth of a particular section. The combination of sequence and level and ancestral trail determines the location of the text block in the document.

Figure 2B:
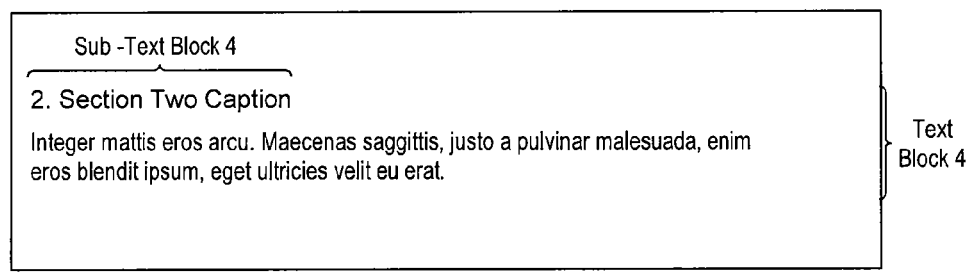
FIG. 2B depicts text blocks and sub-text blocks according to certain implementations.

In a hierarchical domain of documents, nested text blocks are treated as sub-text blocks of its parent. In the example of FIG. 2A, text blocks 4, 5 and 6 are sub-text blocks of text block 2. Text blocks themselves may be composed of sub-text blocks. For example a caption heading may be considered a sub-text block of a text block comprising a paragraph as shown in FIG. 2B. Sub-Text blocks may also be composed of hierarchically nested text blocks.

The scope of a text block is defined by program rules ("formulas") identifying paragraphs, captions, matching words and matching word clusters in other documents.

Depending on the type of source documents, text blocks may be organized at a single level or they may be hierarchically nested (i.e. a text block may contain other text blocks), as shown in FIG. 2B.

(c) Text Block Groups

Figure 3:
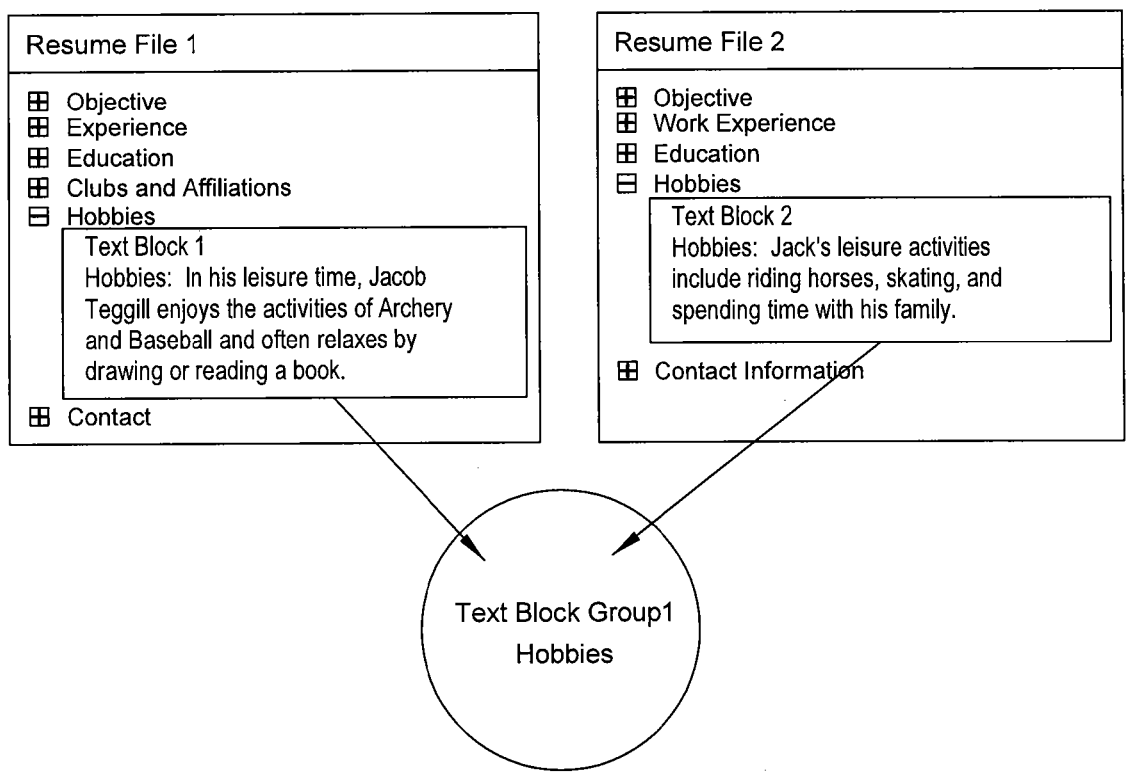
FIG. 3 depicts text blocks groups according to certain implementations.

A text block group is a set of matching text blocks sharing sufficient common characteristics as defined by formulas, scores and thresholds. FIG. 3 shows the example of two resume files and finds that text block 1 in file 1 has shared characteristics with text block 2 in file 2. In this example, the two text blocks are grouped together in the set text block group 1 and the statistical characteristics of a text block group are stored as data profile, capturing the individual and aggregate characteristics of each text block and all related text blocks.

(d) Text Block Group Sets

Figure 4:
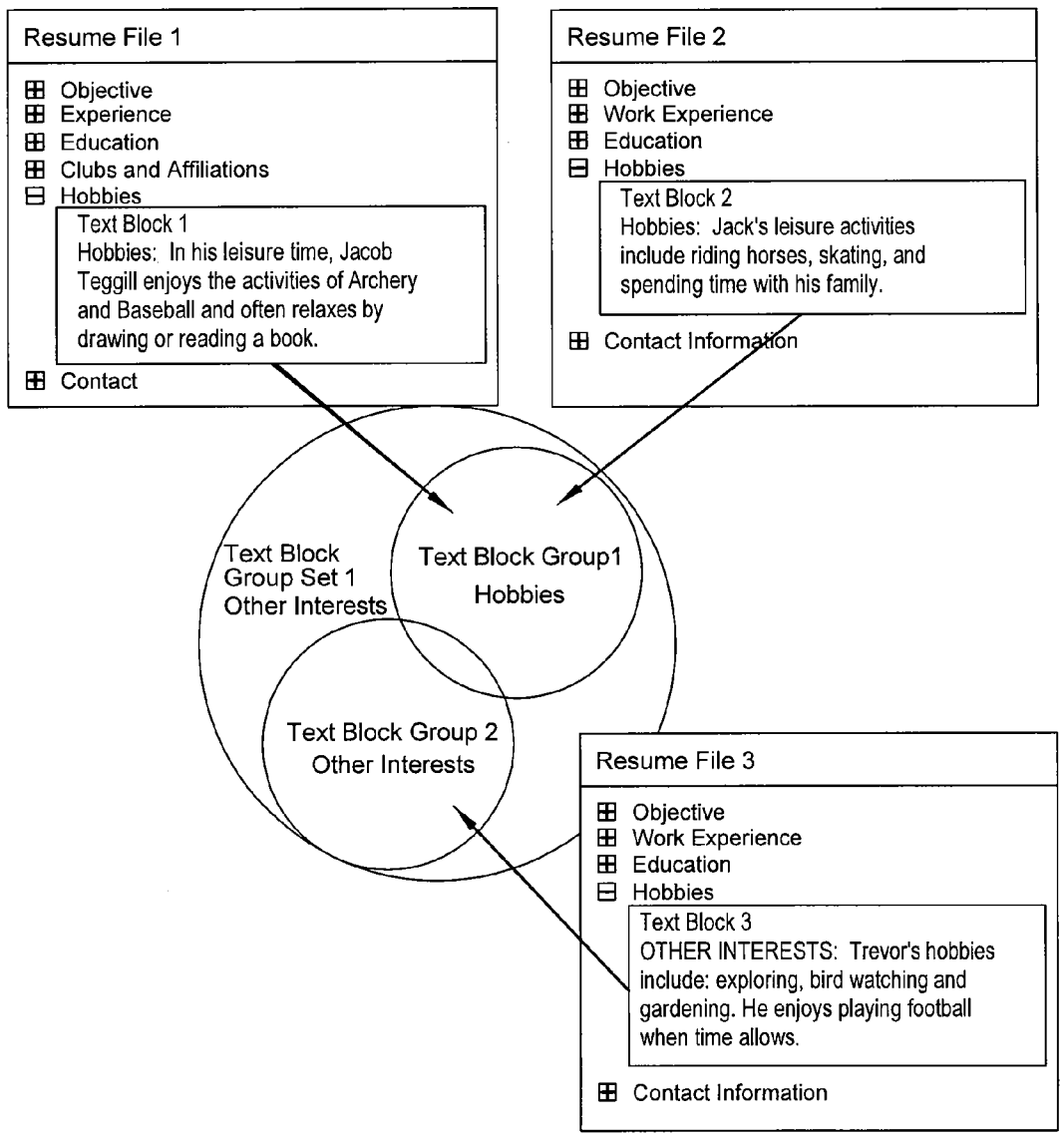
FIG. 4 depicts text blocks group sets provided according to certain implementations.

By analyzing the shared characteristics of each text block group, sets of text block groups are identified. In FIG. 4, a text block captioned "other interests" is found and would likely match similar text blocks in further files and generates a text block group for "other interests". By comparing the text block groups for "hobbies" and "other interests," the engine determines that "hobbies" and "other interests" share sufficient common attributes to be treated as a text block group set.

(2) Formulas and Scores

The engine uses configurable formulas to identify and match file elements. The scoring examples shown in this document are illustrative of the methodology applied. In practice, the engine calculates numerous statistical metrics known to one skilled in the art. A complete set of formulas is shown in Exhibit 4 detailing the pseudo-code for text block-to-text block group matching. All other processes minor this process, but are not detailed in each section for purposes of understanding the overall methodology. A sample configuration file used to set threshold scores is attached as Exhibit 1. A sample output score for each statistical metric is attached as Exhibit 2.

(a) Base Scores (Entity Base Statistics)

Each entity (i.e. words, text blocks, text block groups and text block group set) is given one or more base scores for its characteristics using configurable formulas.

(b) Match Scores (Comparison Entity-to-Entity)

When comparing one entity to another, the engine computes match scores focusing on a range of characteristics such as distinguishing words, leading words, and caption heading words. Each type of match score is created using configurable formulas to determine the level and scope of the shared characteristics of the entities being compared.

(c) Resolution Scores (Organization Statistics)

In many cases, match scores yield different comparative metrics. Resolution scores, again based on configurable formulas, determine the processing methodology for particular tasks, such as generating a template (see tool creation engines, template generation in relation to FIG. 5) or matching text in a new document to a set of data profile. Resolution scoring methods include determining the best match, identifying redundant matches, and assessing the sequence and level of text blocks in a domain of files that possess hierarchical attributes.

(3) Data Profile Creation

The statistical signatures of text block groups are known as data profiles. Data profiles are constructed using an iterative process of building base scores, match scores and resolution scores. The process generally follows the sequence of comparing:

words-to-words
text blocks-to-text blocks
text block groups-to-text block groups
text bocks-to-text block groups
sets of text block groups-to-set of text block groups The process, repeated numerous times, builds the statistical metrics used to identify, compare, and organize text blocks in a chosen set of files.

2.1.2. Data Profile Creation Methodology

Figure 5:
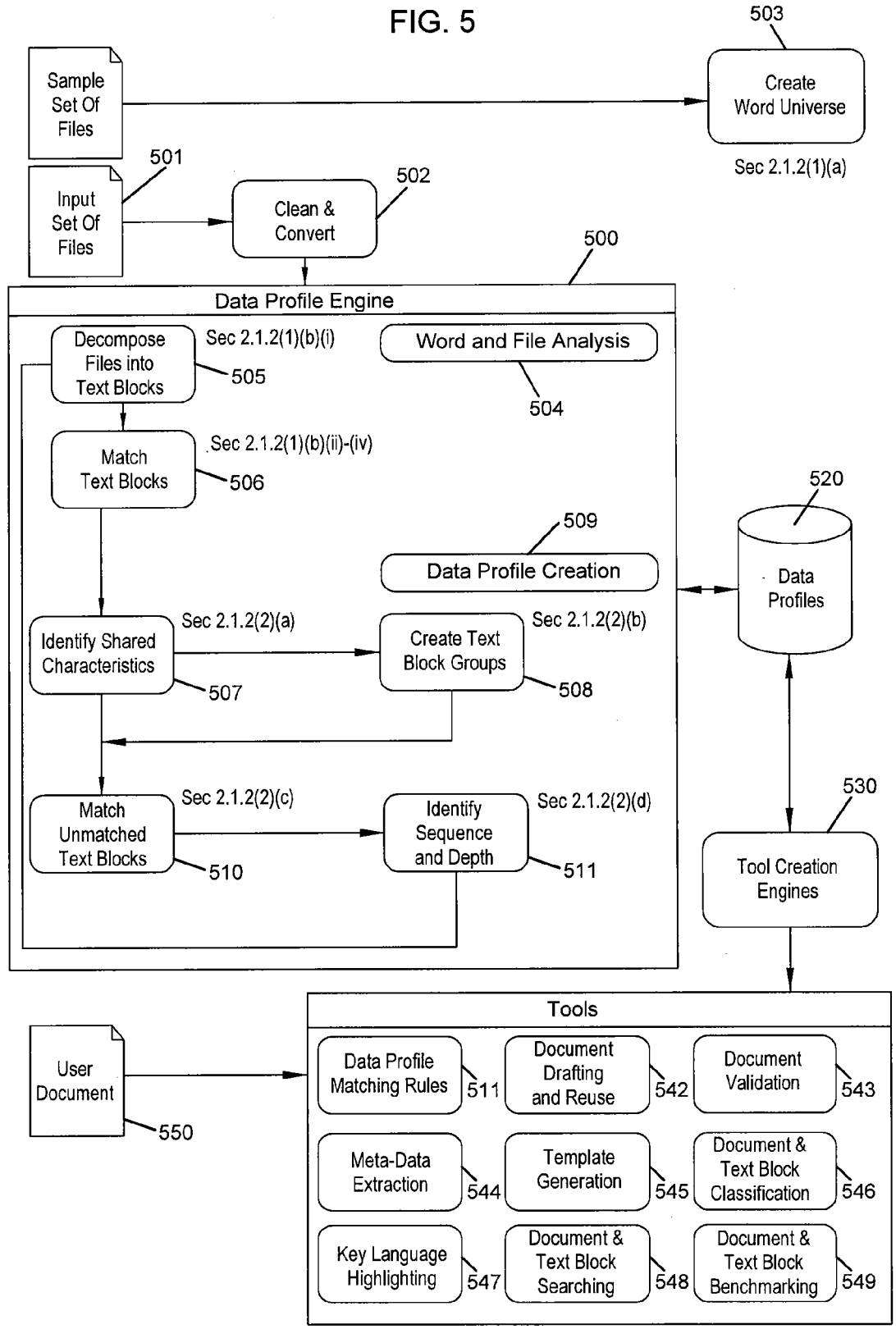
FIG. 5 depicts a workflow process according to certain implementations.

In FIG. 5, a workflow depicts certain implementations of the data profile creation methodology process in which a data profile engine 500 generates data profiles for use in generating tools 540. A data profile engine 500 provided on a computer system receives a set of files 501, which may be cleaned and converted 502, analyzes the files to capture a statistical signature of the files and sections within files, and performs the steps of capturing the identifying and distinguishing attributes and establishing organizational relationships to other files and sections with such other files.

According to certain implementations, a word universe 503 captures the statistical attributes of words in a comprehensive set of files, which may be the same or similar to the set of files 501, and measures word frequency across the files and within sections of such files.

The data profile engine 500 processes the files using a series of formulas to identify text sections and sub-sections ("text blocks" and "sub-text blocks") within documents using lexical and formatting attributes of words and files 504. This file processing decomposes the files into text blocks 505. For example, discrete text blocks are identified in each file by comparison to the statistical signatures of text sections created during the processing sequence or drawn from existing data profiles.

Each text block undergoes a matching process 506, which may involve using a series of formulas for computing statistical scores for each text block in each file. For example, a base statistical score of each text block in each file may be compared to generate match scores. Formulas may be applied to the scores for resolving different comparative metrics and determining match or shared characteristics 507. Text blocks are matched within each file and across a set of files.

Matching sets of text blocks sharing common characteristics are grouped into text block groups 508. In certain implementations, redundant or duplicate text block groups are identified and/or eliminated. For each text block group, a data profile is created 509, which is a definition of the statistical signature of the text block group. The data profile may capture a base statistical score, shared word characteristics, file organization characteristics and alternative match results. Text block groups are compared with each other to determine their matching characteristics, and statistically similar text block groups may be merged, and the text block group's data profile may be updated and refined. In some implementations, certain text blocks are initially unmatched to a text block group either because the text block does not match any group at a particular instance as the text block groups are built, or because the text block group has not been processed by the data profile engine. Accordingly, the unmatched text blocks are compared to text block groups defining a base score, a match score and a set of resolution scores and matched 510.

Text block group sets are generated by comparing text block groups to other text block groups, and those that share common characteristics form a set. The text block group set may be analyzed to determine the correct sequence order of each text block. That is, the sets of text block groups sharing common characteristics are compared to determine the correct hierarchical depth of each text block 511. The comparison may involve implementing a set of configurable rules for iterative reprocessing capturing increasing statistical information for identifying matching text sections with greater precision and broader recall.

Data profiles may be stored on a data profile database 520, and information related to the text blocks, text block groups, and sets of text block groups may be provided to tool creation engines 530 in order to create tools 540 for text block utilization. The tool creation engines 530 allow for the creation of programming tools and product interfaces.

The tool creation engine may include a data profile and matching rules tool 541 for analyzing a user document 550 in a manner similar to the data profile engine 500 in which the document 550 is decomposed into text blocks and matched with a text block group.

A document drafting and reuse tool 542 may deconstruct a user document 550 and identify text blocks based on paragraphs, captions headings, and statistical comparison to document template and text block data profiles. In certain implementations, the user document 250 and document sections may be used as data for use in finding alternative matching sections from a set of documents. In addition, the document drafting and reuse tool 542 may identify an exemplar section from the set of matching sections that most closely conforms to a data profile.

The tool creation engine 530 may generate a document validation tool 543, which may be configured for identifying language conformity in particular sections of a document 550 compared to the data profile. In another embodiment, the document validation tool 543 is for identifying common language or key text based on statistical analysis of word clusters found in text blocks. Data may be extracted for identification of document specific information (such as names, places, dates and amount) applying the statistical comparison of file text blocks to template data profile to a word universe. In another embodiment, the document 250 may be analyzed for identifying and displaying standard language and document specific (or negotiated) language. Document 250 may also be analyzed for identifying the default text block from all data profiles as the text block that contains the most common words, containing all required word clusters and the least number of non-standard words. In addition, document 250 may be evaluated and selected sections compared to a program generated prototypical section providing redline information, including standard language, non-standard language and missing language in a redline format, e.g., underlining, bolding or highlighting standard language, striking through non-standard language, and underlining or italicizing missing language.

Meta-data extraction tool 544 may retrieve meta data from user document 550 by using rule-based techniques to capture titles, headings, names, places and dates.

The tool creation engine 530 may generate a template generation tool 545 for automatic generation of document templates and text block data profiles constructed from multiple source documents, e.g., 501, 551, sample files, etc., creating a single, aggregated outline and index of all distinguishing documents elements that may be displayed as a hierarchical tree or alphabetical list.

In another embodiment, the template generation tool 545 is for automatic generation of master templates combing individual document type templates into a single universal template. For example, combining all legal agreements into a universal template containing all document elements from all the individual document templates, themselves generated from individual source documents. The master template can be constructed as a market standard, a checklist or universe of all text blocks.

The template generation tool 545 may be configured for automatic generation of model templates or documents for particular document types (such as a merger agreement or landscape planning specification) applying mutually exclusive rules and text block redundancy rules to remove similar text blocks found in different locations in individual documents and determine the most frequent location of each template outline element. A model document or templates includes a number of statistically similar text blocks from a source set of model documents.

The template generation tool 545 may be also be configured for automatic generation of checklist templates identifying all common variants of each document hierarchical elements (above a programmatically or user-defined threshold) including redundant text blocks that may be found in different locations in individual documents.

The template generation tool 545 may generate universal templates identifying all distinguishing sections and text blocks in the analyzed document set, including unique text blocks. Derivative templates may also be created from a small source set of files, applying the data profile information from a larger set of similar files.

Furthermore, templates may be analyzed, for example by identifying the frequency that each text block appears in the template. Templates may be analyzed to identify the closest matching templates associated for a particular document applying template matching rules.

In addition, a methodology for editing the templates and checklists to generate customized outlines and text block components to capture exemplar practice or the distinct needs of particular document requirements may also be implemented by the template generation tool 545.

Next, the tool creation engine 530 may generate a document and text block classification tool 546 in which user documents 650 are categorized based on text extraction and statistical comparison to document template and text block data profiles. In another example, the document and text block classification tool 646 categorizes topical sections of documents 550 based on document decomposition, statistical comparison to document templates and text block data profiles.

According to certain implementations, the tool creation engine 530 may generate a key language highlighting tool 547 in which a user document 550 is analyzed and the engine highlights standard terms in a document or section of document showing standard language and non-standard language. A lawyer, for example, may select a particular clause in a Loan Agreement and highlight and distinguish the standard language of the clause, the deal-specific language and key deal terms (such a party names, jurisdictions, dates, amounts etc.).

The tool creation engine 530 may generate a document and text block searching tool 548 for finding entire documents using a file 550 as the search pattern by comparing the file 550 to all template profiles and comparing titles (if available), captions, length, and distinguishing text blocks uniquely associated with a given template. In another embodiment, the document and text block searching tool 548 may identify matching sections using any section of a document, e.g., search terms, captions, sections of text or entire documents, as the search pattern, comparing the document fragment and the source file from which it derives to template profiles and data profiles.

The tool creation engine 530 may generate a document and text block benchmarking tool 549 for analyzing similarity and divergence of an entire document 550 compared to a template providing: (a) statistical measure of frequency for all matching text blocks and (b) a list of all text blocks missing from the selected document compared to the selected templates. In another embodiment, the document and text block benchmarking tool 549 is for analyzing similarity and divergence of selected text blocks or text fragments compared to the template providing a statistical measure of language commonality and variance compared to the a text block data profile.

Aspects of data profile creation methodologies are further described in the example below, in which the methodology is applied to create data profiles in an untrained mode of operation using the example of a set of resumes used for employment application. The example illustrates the steps of the processing of a sample of 1,000 resumes and describes how the resulting text block group set is constructed.

The example assumes the general structure of resumes contains the sections listed in FIG. 6. However, notably, the system is not given this information; the data profile engine deduces the structure applying engine rules and logic.

(1) Word and File Analysis (a) Create Word Universe

The word universe is generated from a large set of sample documents and is used to measure word commonality, mean and divergence in a broad set of documents compared to the word occurrences in specific documents, and word occurrences in specific text blocks. The examples shown illustrate the scoring methodology limited to averages. In addition, scoring applied by the data profile engine calculates and measures other statistical measures, such as mean, mode and deviation.

The word universe statistical score may be built by measuring word occurrences in entire files or text blocks within such files. For purposes of measuring word occurrences in text blocks, an identification formula using special characters, such as carriage returns and line feed is used. By measuring word frequency in text blocks, the word universe can determine whether words appear in distinct sections of files.

In addition to single word occurrences in files and text blocks, the word universe also detects word pairs, word triplets, etc. The example in Table 1 shows an example of statistical measures for word occurrences in files.

(i) Formulas and Scores (Base Score)

TABLE 1

Word Universe Fragment
Total Documents 84,472

| Word | Score 1 | Score 2 | Score 3 | Score 4 | Score 5 | Score 6 |
|---|---|---|---|---|---|---|
| A | 80,249 | 2,487,719 | 0.950 | 29.450 | 31 | 1.053 |
| AA | 9,292 | 204,424 | 0.110 | 2.420 | 22 | 9.091 |
| AARON | 845 | 11,830 | 0.010 | 0.140 | 14 | 99.967 |
| ABA | 16,050 | 288,900 | 0.190 | 3.420 | 18 | 5.263 |
| ABACK | 17,740 | 53,220 | 0.210 | 0.630 | 3 | 7.762 |
| ABAMYNET | 761 | 9,893 | 0.009 | 0.117 | 13 | 111.001 |
| ABANNDON | 12,671 | 38,013 | 0.150 | 0.450 | 3 | 6.667 |
| ABASE | 2,535 | 5,070 | 0.030 | 0.060 | 2 | 33,322 |
| ABATE | 11,827 | 82,789 | 0.140 | 0.980 | 7 | 7.142 |
| ABBA | 169 | 3,042 | 0.002 | 0.036 | 18 | 499.834 |
| ... | ... | ... | ... | ... | ... | ... |

Score 1: Word occurred in files
Score 2: Word occurrences total
Score 3: Word frequency in all files (Score 1/Total Documents)
Score 4: Word average in all files (Score 2/total Documents)
Score 5: Average occurrences per file in documents containing the word (Score 2/Score 3)
Score 6: Word frequency per document (Score 5/Score 4)

The word universe identifies important attributes of each word. For example the words "AARON", "ABAMYNET", and "ABBA" are very rare across the documents (score 3), but when they do occur, these words occur frequently (score 6). Such high frequency words in a file compared to their average frequency in all files indicates that these words are key terms in the file in which they appear. In contrast, words such as "A" occur in approximately the same level of frequency in individual files and all files, indicating that such words are common and non-distinguishing.

(b) Text Blocks and Text Block-to-Text Block Comparison (i) Identify Text Blocks Within a File The identification of text blocks uses configurable rule sets to identify demarcation characteristics and decomposes input documents into text blocks. Depending on the type of documents processed, the rule set may incorporate the following formulas:

Special Characters: Any set of words delimited by special characters "\r\n" (carriage return and line feed).

Captioned Sections: Any set of words marked with an opening caption, where the caption is identified by sufficient elements of: (i) a caption numbering prefix, (ii) a caption title, (identified by formatting characteristics (uppercase, initial capitals, underline, bold, font changes, etc.), and (iii) and a postfix (typically a colon, semi-colon, or comma).

(ii) Formulas for Scoring Text Blocks Using the Word Universe (Base Score)

Each text block is attributed a base score calculated by the sum of its word weights for each word in the text block. The word weights may be carried forward from the word universe or recomputed comparing word frequency in files to word frequency in text blocks.

The calculation of the text block base score is illustrated using the text in FIG. 8. the sample text shows two text blocks taken from two different resumes files. Table 2 shows the calculation of text block 1 from the first resume file.

TABLE 2

Text Block 1 - Base Score
Text Block 1

| Word | Score 1 | Score 2 |
|---|---|---|
| HOBBIES | 0.1 | 1.00 |
| IN | 0.88 | 0.10 |
| HIS | 0.75 | 0.10 |
| LEISURE | 0.21 | 1.00 |
| TIME | 0.23 | 1.00 |
| JACOB | 0.06 | 0.50 |
| TEGGILL | 0.002 | 0.00 |
| ENJOYS | 0.22 | 1.00 |
| THE | 0.91 | 0.10 |
| ACTIVITIES | 0.5 | 1.00 |
| OF | 0.74 | 0.10 |
| ARCHERY | 0.03 | 0.50 |
| AND | 0.96 | 0.10 |
| BASEBALL | 0.05 | 0.50 |
| AND | 0.96 | 0.10 |
| OFTEN | 0.66 | 1.00 |
| RELAXES | 0.15 | 1.00 |
| BY | 0.72 | 0.10 |
| DRAWING | 0.07 | 0.50 |
| OR | 0.95 | 0.10 |
| READING | 0.08 | 0.50 |
| A | 0.95 | 0.10 |
| BOOK | 0.11 | 1.00 |
| Score 3 | | 11.40 |

Word Commonality (Score 1): calculates the word frequency in each file as a percentage of all files applying Formula 1.

Text Block Formula 1: word commonality=number of files containing a word/total number of files in the word universe Score 1: Word Commonality Score 2: Word Weight Score 3: Text Block Base Score In the example, the base commonality scores for text block 1 are shown in Table 1, displaying the word frequencies for each word in the text block. It will be understood that formulas shown are illustrative of the methodology used and not comprehensive of all formulas used in the template engine. Word Weight (Score 2): calculates the word weights applying an adaptable formula.

Text Block Formula 2:

Where the percentage of files in which the word occurs is greater than 70%, the word weight assigned is 0.1 (e.g., high frequency words are weighted relatively lower because they are non-distinguishing and include "noise" words such as "and", "of". "the", etc.)

Where the percentage of files in which the word occurs is greater than 10% and less than 70%, the word weight assigned is 1.0

Where the percentage of files in which the word occurs is greater than 0.01% and less than 10%, the word weight assigned is 0.5

Where the percentage of files in which the word occurs is greater than 0.01%, the word weight assigned is 0.0 (e.g., low frequency words are typically proper nouns (such as names and places), dates, amounts and misspellings)

The Word Weight Scores for Text Block is shown in Table 2.

Text Block Base Score (Score 3): calculates the total of all word weights in the text block.

Text Block Formula 3:

Text Block Base Score=Sum(Base Word Weights in Text Block)

The same methodology is applied to other text blocks to compute their base score. Table 3 shows the base score calculation for text block 2 from the second resume file.

(iii) Matching Two Text Blocks (Match Scores)

After generating text block scores for each file, text blocks in each file are compared to text blocks in every other file to measure the degree of commonality of match. The example shows the text block match scores for text block 1 and text block 2.

Score 1: Commonality Documents

Score 2: Word Weight

Score 3: Text Block Base Score

TABLE 3

Text Block 2 - Base Score
Text Block 2

| Word | Score 1 | Score 2 |
|---|---|---|
| HOBBIES | 0.1 | 1 |
| JACK'S | 0.06 | 0.5 |
| LEISURE | 0.21 | 1 |
| ACTIVITIES | 0.5 | 1 |
| INCLUDE | 0.34 | 1 |
| RIDING | 0.12 | 1 |
| HORSES | 0.06 | 0.5 |
| SKATING | 0.04 | 0.5 |
| AND | 0.96 | 0.1 |
| SPENDING | 0.28 | 1 |
| TIME | 0.23 | 1 |
| WITH | 0.76 | 0.1 |
| HIS | 0.75 | 0.1 |
| FAMILY | 0.12 | 1 |
| Score 3 | | 9.8 |

The match scoring methodology compares any two text blocks and applies a number of different statistical measures to assess similarity and difference, each of which may generate a different score. Examples of the formulas include:

Calculating the sum and word score for all words in each text block

Calculating the sum and match score for matching words in each text Block

Calculating the sum and match score for high weighted words in each text block

Calculating the sum and score for matching words near the beginning of each text block Calculating the sum and score for matching captioned words in each text block Other methods used, but not illustrated, include calculating scores for word pairs, word triplets and word clusters. The data profile engine applies a number of different matching formulas that can be configured depending on the domain set of document analyzed.

The example in Table 4 shows the match results for comparing text block 1 and text block 2. Matching or common words appearing in both text blocks are bolded and italicized.

TABLE 4

Text Block Comparison

| | Text Block 1 | | | | Text Block 2 | | |
|---|---|---|---|---|---|---|---|
| Word | Score 1 | Score 2 | Score 4 | Word | Score 1 | Score 2 | Score 4 |
| A | 95% | 0.10 | | | | | |
| *ACTIVITIES* | 50% | 1.00 | 1.00 | *ACTIVITIES* | 50% | 1.00 | 1.00 |
| *AND* | 96% | 0.10 | 0.10 | *AND* | 96% | 0.10 | 0.10 |
| ARCHERY | 3% | 0.50 | | | | | |
| BASEBALL | 5% | 0.50 | | | | | |
| BOOK | 11% | 1.00 | | | | | |
| BY | 72% | 0.10 | | | | | |
| DRAWING | 7% | 0.50 | | | | | |
| ENJOYS | 22% | 1.00 | | | | | |
| | | | | FAMILY | 12% | 1.00 | |
| *HIS* | 75% | 0.10 | 0.10 | *HIS* | 75% | 0.10 | 0.10 |
| *HOBBIES* | 10% | 1.00 | 1.00 | *HOBBIES* | 10% | 1.00 | 1.00 |
| | | | | HORSES | 6% | 0.50 | |
| IN | 88% | 0.10 | | | | | |
| | | | | INCLUDE | 34% | 1.00 | |
| | | | | JACKS | 6% | 0.50 | |
| JACOB | 6% | 0.50 | | | | | |
| *LEISURE* | 21% | 1.00 | 1.00 | *LEISURE* | 21% | 1.00 | 1.00 |
| OF | 74% | 0.10 | | | | | |
| OFTEN | 66% | 1.00 | | | | | |
| OR | 95% | 0.10 | | | | | |
| READING | 8% | 0.50 | | | | | |
| RELAXES | 15% | 1.00 | | | | | |
| | | | | RIDING | 12% | 1.00 | |
| | | | | SKATING | 4% | 0.50 | |
| | | | | SPENDING | 28% | 1.00 | |
| TEGGILL | 0% | 0.00 | | | | | |
| THE | 91% | 0.10 | | | | | |
| TIME | 23% | 1.00 | 1.00 | TIME | 23% | 1.00 | 1.00 |
| | | | | WITH | 76% | 0.10 | |
| Score 3 | | 11.3 | | Score 3 | | 8.8 | |
| Score 5 | | 4.2 | | Score 5 | | 4.2 | |
| Score 6 | | 0.37 | | Score 6 | | 0.48 | |
| Score 7 | | 9.0 | | Score 7 | | 8.0 | |
| Score 8 | | 6.0 | | Score 8 | | 6.0 | |
| Score 9 | | 0.7 | | Score 9 | | 0.8 | |

Score 1: Word Commonality
Score 2: Word Weight
Score 3: Word Weight Sum
Score 4: All Words Weight Sum
Score 5: Match Word Weight Sum
Score 6: Text Block Matching Words Base Score (Score 5/Score 3)
Score 7: High Weight Words Sum (where word weight = 1)
Score 8: High Weight Words Match Sum
Score 9: Text Block High Weight Words Base Score (Score 8/Score 7)

Matching Word Formulas
Matching words in the text block examples are italicized.
  Text Block Formula 1 (Score 5)
  Word Weight Match Sum=Sum (Word Weight Scores for all matching words)
  Text Block Formula 2 (Score 6)
  Text Block Base Score (based on matching words)=Word Weight Match Sum/Total Word Weight Score
  High Word Weight Formulas Text Block 1

HOBBIES: In his leisure time, Jacob Teggill enjoys the activities of Archery and Baseball and often relaxes by drawing or reading a book.

Text Block 2

HOBBIES: Jack's leisure activities include riding horses, skating, and spending time with his family.

High frequency word formulas focus on the most distinguishing words in the text blocks. In the example, the high weight words are italicized. The resulting formulas yield a score of 0.67 for Text Block 1 and 0.75 for Text Block 2.
  Leading Words Formulas Text Block 1

[HOBBIES: In his leisure] time, Jacob Teggill enjoys the activities of Archery and Baseball and often relaxes by drawing or reading a book.

Text Block 2

[HOBBIES: Jack's leisure] activities include riding horses, skating, and spending time with his family.

Key topical features of a text block are frequently found at the start as authors typically draft from general to specific. Applying this circumstance, scores can be calculated based on a defined number of leading words in each text block. In the example, the first 4 words are used to generate a leading word score. The formula definitions apply the same methodology as used high word weight formulas. The resulting formulas yield a score of 1.0 for both text block and text block 2.

Caption Words Formulas

Text Block 1

[HOBBIES]: In his leisure time, Jacob Teggill enjoys the activities of Archery and Baseball and often relaxes by drawing or reading a book.

Text Block 2

[HOBBIES]: Jack's leisure activities include riding horses, skating, and spending time with his family.

Section captions also provide valuable information about the topical content of the Text Block. The formula definitions apply the same methodology as used high word weight formulas. the resulting formulas yield a score of 1.0 for both text block and text block 2. As detailed in later sections, the data profile engine stores the caption word sequence and its scores as a sub-text block.

(iv) Resolution Scores

The text block matching formulas provide different comparison metrics for each text block. Formulas and rules can then be applied to solve particular tasks. For example, if the task is to identify whether two text blocks match, a text block match rule may be applied. Using the example, some of the potential match score are shown in Table 5.

TABLE 5

Match Scores Based on Different Formulas

| Text Block 1 | | Text Block 2 | |
|---|---|---|---|
| Matching Words (Score 6) | 0.37 | Matching Words (Score 6) | 0.48 |
| High Weight Words (Score 9) | 0.67 | High Weight Words (Score 9) | 0.75 |
| Sub-Text Block 1 - Leading Words (*) | 1 | Sub-Text Block 1 - Leading Words (*) | 1 |
| Sub-Text Block 2 - Caption Words (*) | 1 | Sub-Text Block 2 - Caption Words (*) | 1 |

(*) Calculation details not shown; based on prior examples

Text Block Match Rule Examples

Text Block Resolution Formula 1
If Text Block 1 Score 6 and Text Block 2 Score 6 are both greater than 0.4, then it is a match.
This rule identifies that significant number of the distinguishing words matched.

Text Block Resolution Formula 2
If Text Block 1 Score 6 and Text Block 2 Score 6 are both greater than 0.2 and Text Block 1 Leading Word Score 6 and Text Block 2 Leading Word Score 6 are greater than 0.8, then it is a match.
This rule identifies than some of the distinguishing words matched and the leading words indicated a strong match.

(2) Data Profile Creation

The data profile engine uses a multi-pass methodology to build data profiles, iterating through all or some of the steps described in each pass. The order of these steps outlined will vary, dependent on configuration options and the nature of the document domain. In some cases they may be less linear. The steps outlined below show the typical composition of the first pass through the process.

(a) Text Block-to-Text Block Comparison
(i) Identify Text Blocks

The identification of the scope text blocks is refined during the iterative procedure. in the initial identification of text blocks described above, the data profile engine uses lexical and formatting characteristics to identify text blocks. As more detailed information about the text blocks is constructed, data profile matching is used is identify and demark text blocks. In addition, data profile information from prior processing can be used, which is described further in the bootstrapping example—document decomposition.

(ii) Match Text Blocks Across Files

As the data profile engine builds information about each text block, its characteristics and its organizational relationships to other text blocks, the engine is tuned for strict matching. In other words, the initial passes are optimized for greater precision to find only those text blocks that are strong matches. In the current example, text block matching is performed between different files, but text matching may also be applied within files.

The results of matching process create text block groups which are set of text blocks sharing similar characteristics as identified by formulas.

(b) Text Block Group-to-Text Block Group Comparison
(i) Create Initial Text Block Groups In the current example, initial sets of matching text blocks are identified by a sub-text block caption word formula, described in 2.1.1(1)(b)(iii), in order to generate high precision matches.

Text Block Group Match Formula:
Where
  Text Block 1 Caption Word Score is greater than 0.9 And
  Text Block 2 Caption Word Score is greater than 0.9, combine the Text Blocks as an initial Text Block Group.

Where 1,000 resumes are processed, the results are shown in Table 6 showing the text blocks groups and the number of matching text blocks in each group.

TABLE 6

Initial Text Group Results

| Text Block Group | Number of Text Blocks |
|---|---|
| Objective | 950 |
| Experience | 920 |
| Education | 870 |
| Clubs and Affiliations | 210 |
| Hobbies | 190 |
| Other Interests | 150 |
| Contact | 850 |

In addition, many text blocks did not match.

(ii) Redundancy Check

Redundancy rules eliminate duplicate variants. In many cases, individual documents may use a different caption heading to describe the same or similar concept. In the example, "Hobbies" and "Other Interests" likely capture a similar subject matter. Analysis of the files shows that a number of different files have a category for "Hobbies" and "Other Interests," but very few have both. The redundancy rules define the metrics for identifying duplicate variants and the least occurring forms.

TABLE 7

Text Group Comparison - Calculating Redundancy

| Text Block Group | Text Block Group | Score 1 | Score 2 |
|---|---|---|---|
| Objective | Experience | 805 | 0.875 |
| Objective | Education | 786 | 0.903 |
| Objective | Clubs and Affiliations | 155 | 0.738 |
| Objective | Hobbies | 97 | 0.511 |
| Objective | Other Interests | 107 | 0.713 |
| Objective | Contact | 737 | 0.867 |
| Experience | Education | 834 | 0.959 |
| Experience | Clubs and Affiliations | 175 | 0.833 |
| Experience | Hobbies | 116 | 0.611 |
| Experience | Other Interests | 58 | 0.387 |

TABLE 7-continued

Text Group Comparison - Calculating Redundancy

| Text Block Group | Text Block Group | Score 1 | Score 2 |
|---|---|---|---|
| Experience | Contact | 757 | 0.891 |
| Education | Clubs and Affiliations | 184 | 0.876 |
| Education | Hobbies | 126 | 0.663 |
| Education | Other Interests | 116 | 0.773 |
| Education | Contact | 747 | 0.879 |
| Clubs and Affiliations | Hobbies | 136 | 0.716 |
| Clubs and Affiliations | Other Interests | 107 | 0.713 |
| Clubs and Affiliations | Contact | 737 | 0.867 |
| Hobbies | Other Interests | 2 | 0.013 |
| Hobbies | Contact | 189 | 0.995 |
| Other Interests | Contact | 135 | 0.900 |

Score 1: Count of files containing both Text Block Groups
Score 2: Redundant Count/Total Number of Files (%)

The sample formulas calculate the following scores:
Redundancy Formula 1(Score 1)
Redundant Count=Count of files containing both Text Block Groups
Redundancy Formula 2(Score 2)
Redundant Score=Redundant Count/Total Number of Files The redundant scoring detects that "Hobbies" and "Other Interests" appear in the same resume very infrequently. Where the word commonality score further indicates that the section covers the same topic, the text block group "Hobbies" is retained because it appears in more files than "Other Interests".

The methodology of fine tuned using additional match scores including high weigh words, leading words, captioned words, and word clusters.

(iii) Create Initial Text Block Group Profile

TABLE 8

Text Block Group Data Profile
Text Block Group 1
Number of Files 1,000
Number of Text Block Groups 6

| Word | Score 1 | Score 2 | Score 3 | Score 4 | Score 5 | Score 6 | Score 6 |
|---|---|---|---|---|---|---|---|
| ACTIVITIES | 1 | 550 | 0.55 | 2 | 0.33 | 0.67 | 0.37 |
| HOBBIES | 1 | 360 | 0.36 | 1 | 0.17 | 0/83 | 0.30 |
| INTERESTS | 1 | 412 | 0.41 | 2 | 0.33 | 0.67 | 0.27 |
| LEISURE | 1 | 244 | 0.24 | 1 | 0.17 | 0.83 | 0.20 |
| TIME | 1 | 265 | 0.27 | 2 | 0.33 | 0.67 | 0.18 |
| FAVORITE | 1 | 212 | 0.21 | 1 | 0.17 | 0.83 | 0.18 |
| ENJOYS | 1 | 242 | 0.24 | 2 | 0.33 | 0.67 | 0.16 |
| THING | 1 | 312 | 0.31 | 3 | 0.50 | 0.50 | 0.16 |
| SPENDING | 1 | 308 | 0.31 | 3 | 0.50 | 0.50 | 0.15 |
| RELAXES | 1 | 165 | 0.17 | 1 | 0.17 | 0.83 | 0.14 |
| INCLUDE | 1 | 374 | 0.37 | 4 | 0.67 | 0.33 | 0.12 |
| SECOND | 1 | 363 | 0.36 | 4 | 0.67 | 0.33 | 0.12 |
| FREE | 1 | 198 | 0.20 | 3 | 0.50 | 0.50 | 0.10 |
| EXPLORING | 1 | 143 | 0.14 | 2 | 0.33 | 0.67 | 0.10 |
| FAMILY | 1 | 132 | 0.13 | 2 | 0.33 | 0.67 | 0.09 |
| RIDING | 1 | 132 | 0.13 | 2 | 0.33 | 0.67 | 0.09 |
| DISTANT | 1 | 242 | 0.24 | 4 | 0.67 | 0.33 | 0.08 |
| BOOK | 1 | 121 | 0.12 | 2 | 0.33 | 0.67 | 0.08 |
| FRONT | 1 | 220 | 0.22 | 4 | 0.67 | 0.33 | 0.07 |
| ALLOWS | 1 | 330 | 0.33 | 5 | 0.83 | 0.17 | 0.06 |
| PLAYING | 0.5 | 77 | 0.08 | 1 | 0.17 | 0.83 | 0.03 |
| TV | 0.5 | 77 | 0.08 | 1 | 0.17 | 0.83 | 0.03 |
| READING | 0.5 | 88 | 0.09 | 2 | 0.33 | 0.67 | 0.03 |
| WATCHING | 0.5 | 88 | 0.09 | 2 | 0.33 | 0.67 | 0.03 |
| BIRD | 0.5 | 66 | 0.07 | 1 | 0.17 | 0.83 | 0.03 |
| HORSES | 0.5 | 66 | 0.07 | 1 | 0.17 | 0.83 | 0.03 |
| PLAYSTATION | 0.5 | 66 | 0.07 | 1 | 0.17 | 0.83 | 0.03 |
| DRAWING | 0.5 | 77 | 0.08 | 2 | 0.33 | 0.67 | 0.03 |
| BASEBALL | 0.5 | 55 | 0.06 | 1 | 0.17 | 0.83 | 0.02 |
| GARDENING | 0.5 | 55 | 0.06 | 1 | 0.17 | 0.83 | 0.02 |
| WRESTLING | 0.5 | 55 | 0.06 | 1 | 0.17 | 0.83 | 0.02 |
| FOOTBALL | 0.5 | 44 | 0.04 | 1 | 0.17 | 0.83 | 0.02 |
| SKATING | 0.5 | 44 | 0.04 | 1 | 0.17 | 0.83 | 0.02 |
| ARCHERY | 0.5 | 33 | 0.03 | 1 | 0.17 | 0.83 | 0.01 |
| JACK'S | 0.5 | 66 | 0.07 | 4 | 0.67 | 0.33 | 0.01 |
| JACOB | 0.5 | 66 | 0.07 | 4 | 0.67 | 0.33 | 0.01 |
| JOSHUA'S | 0.5 | 55 | 0.06 | 4 | 0.67 | 0.33 | 0.01 |
| TREVOR'S | 0.5 | 44 | 0.04 | 4 | 0.67 | 0.33 | 0.01 |
| OFTEN | 1 | 726 | 0.73 | 6 | 1.00 | 0.00 | 0.00 |
| OTHER | 1 | 363 | 0.36 | 6 | 1.00 | 0.00 | 0.00 |
| | | | | | | Score 8 | 3.40 |

Score 1: Word Weight
Score 2: Number of files containing the word
Score 3: File occurrence percentage (Score 2/Number of Files)
Score 4: Number of different Text Block Groups containing the word
Score 5: Text Block Group percentage (Score 4/Number of Text block Groups)
Score 6: One minus Text Block Group percentage (1 − Score 5)
Score 7: Profile Word Weight (Score 1 * Score 3 * Score 6)
Score 8: Text Block Group Base Score (Sum Score 7)

Data Profile scores for each Text Block Group is calculated using the example formulas.
Data Profile Formula 1(Score 1)
Word Weights=Word Universe Word Weight
Data Profile Formula 2(Score 2)
Number of files containing the word
Data Profile Formula 3(Score 3)
Percentage of files containing the words=(Score 1/Number of Files)*100
Data Profile Formula 4(Score 4)
Number of different Text Block Groups containing the words
Data Profile Formula 5(Score 5)
Percentage of Text Block Groups containing the Text Block Common Words=(Score 45/Number of Text Block Groups)*100
Data Profile Formula 6(Score 6)
Distinguishing Word Factor=Inverse Factor(1−Score 5)[1]
  [1] The Inverse Factor is computed because it weights words that appear less frequently across the Text lock Groups
Data Profile Formula 7(Score 7)
Word Profile Weight Score calculating the relative value of the word as a component of the Text Block Group=Score1*Score3*Score6
Data Profile Formula 8(Score 8)
Data Profile Score=Sum of all Word Profile Weight Scores
Examples of other more advanced formulas include:
Squaring Score 6 and Score 3 to highlight the distinguish characteristics of text block group comparisons.
Calculating percentage of text block group members that a word occurs in and only saving words that occur in 50% or more of the text block group members.
Also see examples in Section 2.2.1(3) Bootstrapping Example—Text Block Group-to-Text Block Group Comparison (iv) Profile-to-Profile Comparison After generating data profile scores for each matching text blocks, each data profile is compared to all other data profile to measure the degree of shared characteristics.

The data profile engine applies a number of different matching formulas that can be configured depending on the domain set of document analyzed. The final data profile comparison score indicates the comparative match level between the two data profiles.

TABLE 9

Text Block Group Profile Matching

| Hobbies | | | Other Interests | | |
|---|---|---|---|---|---|
| Word | Score 1 | Score 2 | Word | Score 1 | Score 2 |
| ACTIVITIES | 0.367 | 0.367 | INTERESTS | 0.361 | 0.361 |
| HOBBIES | 0.300 | 0.300 | HOBBIES | 0.295 | 0.295 |
| INTERESTS | 0.275 | 0.275 | ACTIVITIES | 0.291 | 0.291 |
| LEISURE | 0.203 | 0.203 | LEISURE | 0.221 | 0.221 |
| TIME | 0.177 | 0.177 | WORKING | 0.177 | 0.000 |
| FAVORITE | 0.177 | 0.177 | ENJOYS | 0.177 | 0.177 |
| ENJOYS | 0.161 | 0.161 | TIME | 0.161 | 0.161 |
| THING | 0.156 | 0.000 | FREE | 0.156 | 0.156 |
| SPENDING | 0.154 | 0.154 | FAMILY | 0.156 | 0.156 |
| RELAXES | 0.138 | 0.138 | SECOND | 0.154 | 0.154 |
| INCLUDE | 0.125 | 0.125 | RELAXES | 0.138 | 0.138 |
| SECOND | 0.121 | 0.121 | SPENDING | 0.125 | 0.125 |
| FREE | 0.099 | 0.099 | INCLUDE | 0.121 | 0.121 |
| EXPLORING | 0.095 | 0.000 | FAVORITE | 0.095 | 0.095 |
| FAMILY | 0.088 | 0.088 | FRONT | 0.088 | 0.088 |
| RIDING | 0.088 | 0.088 | FOOTBALL | 0.088 | 0.088 |
| DISTANT | 0.081 | 0.081 | SPELUNKING | 0.086 | 0.000 |
| BOOK | 0.081 | 0.081 | DISTANT | 0.081 | 0.081 |
| FRONT | 0.073 | 0.073 | BOOK | 0.081 | 0.081 |
| ALLOWS | 0.055 | 0.055 | ALLOWS | 0.073 | 0.073 |
| PLAYINGS | 0.032 | 0.032 | RIDING | 0.055 | 0.055 |
| TV | 0.032 | 0.000 | PLAYING | 0.032 | 0.032 |
| READING | 0.029 | 0.029 | HUNTING | 0.032 | 0.000 |
| WATCHING | 0.029 | 0.000 | SKATING | 0.029 | 0.029 |
| BIRD | 0.028 | 0.000 | JOGGING | 0.028 | 0.000 |
| HORSES | 0.028 | 0.000 | DRAWING | 0.028 | 0.028 |
| PLAYSTATION | 0.028 | 0.000 | SOCCER | 0.028 | 0.000 |
| DRAWING | 0.026 | 0.026 | BIRD | 0.026 | 0.000 |
| BASEBALL | 0.023 | 0.000 | READING | 0.023 | 0.023 |
| GARDENING | 0.023 | 0.000 | BOCHE | 0.023 | 0.000 |
| WRESTLING | 0.023 | 0.000 | PAINTING | 0.023 | 0.000 |
| FOOTBALL | 0.018 | 0.018 | GOATS | 0.018 | 0.000 |
| SKATING | 0.018 | 0.018 | BRIDGE | 0.018 | 0.000 |
| ARCHERY | 0.014 | 0.000 | RADIO | 0.014 | 0.000 |
| JACK'S | 0.011 | 0.000 | JILL | 0.011 | 0.000 |
| JACOB | 0.011 | 0.000 | CAROL | 0.011 | 0.000 |
| JOSHUA'S | 0.009 | 0.000 | GARY'S | 0.009 | 0.000 |
| TREVOR'S | 0.007 | 0.000 | TOM | 0.007 | 0.000 |
| OFTEN | 0.000 | 0.000 | WHILE | 0.000 | 0.000 |
| OTHER | 0.000 | 0.000 | NEVER | 0.000 | 0.000 |
| Score 3 | 3.401 | | Score 3 | 3.539 | |
| Score 4 | | 2.885 | Score 4 | | 3.028 |
| Score 5 | | 0.8482 | Score 5 | | 0.8557 |

Score 1: Profile Word Weight
Score 2: Points for matched words
Score 3: Sum of word weights
Score 4: Sum of matching word points
Score 5: Score 4/Score 3

Data Profile Formula 8(Score 1)
Word Profile Weight Score=carried forward from Data Profile Score 7
Data Profile Formula 9(Score 2)
Match Points=Where both Text Block Groups contain the word then use Score 1, otherwise zero
Data Profile Formula 10(Score 3) Word Weight Total=Sum (Score 1)
Data Profile Formula 11(Score 4) Match Points Total=Sum (Score 2)
Data Profile Formula 12(Score 5)
Data Profile Comparison Score=Score4/Score3
Applying the formulas to the example yields the results:

| "Hobbies" | score 5 = 0.848 |
|---|---|
| "Other Interests" | score 5 = 0.856 | indicating that the two data profiles share many common characteristics.

Examples of other more advanced formulas include:
Ignore lower point words so as not to subtract points for words that lack distinguishing characteristics and not to award points to a highly ranked word in one text block group that matches a low rank word in the other text block group.
Computing statistical metrics for sub-profiles based on sub-text blocks, such as the caption heading sub-text block with the text block encapsulating an entire paragraph.

(v) Merge Text Block Groups

Profile-to-profile matching, performed in step B.3(b) determines that data profiles for "Hobbies" and "Other Interests" are similar and the redundancy check performed in step B.3(c) indicates they are duplicate variants. Merge rules are defined whereby data profile meeting configurable rule set are merged into one text block group. In the example, the "Hobbies" branch will have 340 members. The profiles are be recalculated to reflect this new combined text block group.

Since this example is a data domain with captions, captions are stored as sub text blocks and sub text block groups.

---

TBG: "Hobbies" (340) Profile:
  Sub TBG: captions
    Sub TBG with caption = "Hobbies" (190)
    Profile
    Sub TBG with caption = "Other Interests" (150)
    Profile
  Other Profile information (e.g. word and file statistics).

---

This allows, for example, formulas to be used that understand the sub text block groups profiles such as using the various captions associated (via sub text block groups) with the text block groups to be used to match another caption. As a result, the engine stores "Other Interests" as an alternative caption to "Hobbies" and this information can be used in subsequent passes through the engine to match captions.

---

Output Step B.3(d)

Objective (950 Text Blocks)
Experience (920 Text Blocks)
Education (870 Text Blocks)
Clubs and Affiliations (210 Text Blocks) Hobbies (340 Text Blocks)
Contact (850 Text Blocks)

---

(c) Text Block-to-Text Block Group Comparison

The process of creating initial text block groups is tuned for high precision. As a result many text blocks are likely not matched to a text block. With the additional information in the data profiles, these unmatched text blocks can be compared to the data profiles.

(i) Base Scores

Each unmatched text block is compared to all data profiles. In this example, unmatched text block 5 (from file 3) is compared to the data profile of the hobbies text block group.

---

Sample Text Block 5 (from File x)

LEISURE: John's hobbies include many activities such as wake boarding, painting and landscaping. He enjoys playing bocce ball any time he can.

TABLE 10

Text Block-to-Text Block Group Matching

| Unmatched Text Block 5 | | | Hobbies Text Block Group | | |
|---|---|---|---|---|---|
| Word | Score 1 | Score 2 | Word | Score 1 | Score 2 |
| LEISURE | 0.210 | 1 | ACTIVITIES | 0.367 | 0.367 |
| John's | 0.030 | 0.5 | HOBBIES | 0.300 | 0.300 |
| hobbies | 0.100 | 1 | Interests | 0.275 | 0.275 |
| include | 0.340 | 1 | LEISURE | 0.203 | 0.203 |
| many | 0.870 | 0.1 | time | 0.177 | 0.177 |
| activities | 0.500 | 1 | favorite | 0.177 | 0.177 |
| such | 0.870 | 0.1 | enjoys | 0.161 | 0.161 |
| as | 0.870 | 0.1 | thing | 0.156 | 0.000 |
| wake | 0.040 | 0.5 | spending | 0.154 | 0.154 |
| boarding | 0.040 | 0.5 | relaxes | 0.138 | 0.138 |
| painting | 0.040 | 0.5 | include | 0.125 | 0.125 |
| and | 0.960 | 0.1 | second | 0.121 | 0.121 |
| landscaping | 0.040 | 0.5 | free | 0.099 | 0.099 |
| he | 0.780 | 0.1 | exploring | 0.095 | 0.000 |
| enjoys | 0.220 | 1 | family | 0.088 | 0.088 |
| playing | 0.070 | 0.5 | riding | 0.088 | 0.088 |
| bocce | 0.040 | 0.5 | distant | 0.081 | 0.081 |
| ball | 0.030 | 0.5 | book | 0.081 | 0.081 |
| any | 0.870 | 0.1 | front | 0.073 | 0.073 |
| time | 0.230 | 1 | allows | 0.055 | 0.055 |
| he | 0.780 | 0.1 | playing | 0.032 | 0.032 |
| can | 0.870 | 0.1 | TV | 0.032 | 0.000 |
| Score 3 | | 10.8 | reading | 0.029 | 0.029 |
| | | | watching | 0.029 | 0.000 |
| | | | bird | 0.028 | 0.000 |
| | | | horses | 0.028 | 0.000 |
| | | | PlayStation | 0.028 | 0.000 |
| | | | drawing | 0.026 | 0.026 |
| | | | Baseball | 0.023 | 0.000 |
| | | | gardening | 0.023 | 0.000 |
| | | | Wrestling | 0.023 | 0.000 |
| | | | football | 0.018 | 0.018 |
| | | | skating | 0.018 | 0.018 |
| | | | Archery | 0.014 | 0.000 |
| | | | Jack's | 0.011 | 0.000 |
| | | | Jacob | 0.011 | 0.000 |
| | | | Joshua's | 0.009 | 0.000 |
| | | | Trevor's | 0.007 | 0.000 |
| | | | often | 0.000 | 0.000 |
| | | | OTHER | 0.000 | 0.000 |
| | | | Score 3 | 3.401 | |
| | | | Score 4 | | 2.885 |
| | | | Score 5 | | 0.848 |

Score 1: Profile Word Weight
Score 2: Matched Word Points
Score 3: Sum Profile Word Weight (Score 1)
Score 4: Sum Matched Word Points (Score 2)
Score 5: Score 4/Score 3

Applying the text block comparison methods described earlier, the system calculates the selected data metrics. In this example high frequency word weight word scores and leading word scores are computed, however, additional comparison formulas may be applied depending of the type of document set analyzed.

High Word Weight Comparative Scores
Text Block Match Formula 1
High Weight Word Match Score=sum(high frequency word weight points)/Word Weight(Hobbies Text Block Score 2)

---

Hobbies Score = 1.079/2.885 = 0.370
Text Block 5 Score = 4.50/10.800 = 0.420

---

Leading Words Comparative Scores (first 4 words)
Text Block Match Formula 2
Leading Word Match Score=sum(leading word weight points)/Word Weight (Hobbies Text Block Score 2)

---

Hobbies Score = 0.870/1.445 = 0.760
Text Block 5 Score = 2/3.5 = 0.57

---

Additional match scores can be calculated and match rules applied through configuration settings. (See Exhibit 3). Where the unmatched text block is determined to meet the rules, it is added to the text block group, augmenting the statistical information in the profile.

(ii) Match and Resolution Scores

The data profile engine will often generate multiple strong matches for text blocks and data profiles. Formulas and rules are applied to determine the best matches. In the circumstance of identifying a unique set of text block groups, as opposed to document matching, the formulas and rules are tuned for high precision. Where the task is matching a new document to the data profiles the match rules are relaxed and tuned for higher recall.

In general, the best match rules draw on information in the data profiles and the match results generated in the process of creating text blocks and data profiles. The example shown illustrates a simple application of the approach.

Sample Best Match Rule 1
If
((Match Score X of Text Block Group 1 is within 0.1 of Match Score X of Text Block Group 2)
and
(Match Score Y of Text Block Group 1 is greater than Match Score Y of Text Block Group 2)
Then, Text Block Group 1 is the best match Otherwise: Text Block Group 2 is the best match
Otherwise If
(Match Score X of Text Block Group 1 is greater than Match Score X of Text Block Group 2)
Then, Text Block Group 1 is the best match Otherwise Text Block Group 2 is the best match Typically, resolution of best matches requires the application of several formulas and scores. For example, if match score of text block 1 and match score of text block 2 are both strong, then the match attributes of other text blocks are analyzed to evaluate the degree of match and what they matched.

Sample Best Match Rule 2
If Text Block Group 1 has already been matched, then Text Block Group 2 is considered the Best Match.

Sample Best Match Rule 3
If Text Block is located contiguously with an unmatched Text Block, then choose the match that is most proximate to that other Text Block's matched Text Block Group.

It is important to note that the system retains knowledge (in the data profile) of why matches were assigned and what other potential matches exist. This allows for later use of these statistics for future decisions.

(d) Text Block Group Sets

A text block group set is a collection of text block groups as defined by configurable formulas. An example is the set of all text block groups in a document domain. Another example is the set of all text block groups that share certain characteristics across document domains.

(i) Sequencing

Text block group sets generated by the engine can reflect the order most commonly appearing in the input set of documents. In the example, the resume structure follows the order: objective, experience, education, clubs and affiliations, hobbies and contacts. Individual documents may choose a different sequence. The goal of the sequencing formulas is to determine the appropriate order of the data profiles by means of statistical averages, adjusted where necessary to handle exceptional cases.

To illustrate the approach, formulas are applied first to identify the relative average location of each text block in its source file.

Sequencing Formula 1

Relative File Sequence=File Sequence Order/Total File Text Blocks in the File Text Block Sequence Average=Sum(File Sequence)/Total Files in Text Block Group

| Text Block Group | Order in File | Total Text Blocks in File | Relative Sequence |
|---|---|---|---|
| Hobbies | 5 | 6 | 0.833 |
| Hobbies | 4 | 4 | 1.000 |
| Hobbies | 4 | 5 | 0.800 |
| | Average Relative Sequence | | 0.878 |

Text Block Group Average Relative Sequence is therefore: 0.878. Applying the relative sequence of all text blocks groups, individual text blocks and all text blocks groups can be ordered by this sequence value. In some cases, additional formulas are applied to capture sections that typically appear in a particular order, such as the contacts sections of a resume that is usually the last section of the file. Average relative sequence is supplemented with mean and modal sequence statistics to gather information about absolute sequencing, such text blocks that typically appear at the start or the end of a file, or typically appear following a particular text block.

(ii) Hierarchy

Data profile also gathers information about the organizational structure and relationships between text blocks to determine the depth level of each text block and its parent-sibling-child relationships. The hierarchical associations provide the engine more data points with which to make decisions such as the familial relationships and sub sequencing. For example, where the engine is analyzing sample text block 15, the structural elements shown in FIG. 6 may be identified.

| Text Block 15 |
|---|
| LEISURE TIME ACTIVITIES |
| SPORTS AND RECREATION: Integer mattis eros ut arcu. Maecenas sagittas, justo a pulvinar malesuada, enim eros blandit ipsum, eget ultices velit ipsum eu erat. |
| HOBBIES: Lorem ipsum dolor sit amet, consecutetuer adipiscing elit. Proin vulputate, nibh sit amet tincidunt pellentesque, lorem purus mollis orci, eu mollis enim quam erat. Morbi facilis fermentum felis. |

In the first pass (based on an untrained mode of operation), the engine relies formatting and lexical rules to identify the relationships in the same manner undertaken in identifying text blocks in the first iteration through the input set of documents. After data profiles have been constructed, the relationship information in the profiles can be applied to identify the text blocks and the relationships between the text blocks. The engine captures and stores the profile information for hierarchically nested text blocks as sub text blocks applying the same methodology used to capture and store captions, as discussed in section 2.1.2(1)(b).

(iii) Common Sub-Groups Rules

Text block relationship rules analyze familial relationships of a particular text block. In one approach, the engine matches text block 15 "Leisure Time Activities" to the text block group 10 "Other Interests" because they posses matching children. In practice, numerous profile matching techniques applying the matching approaches described are required to determine if the children of a text block match the children of a text block group.

| Text Block Group 10 |
|---|
| Text Block Group 10 (Data Profile Hierarchy) |
| OTHER INTERESTS |
| SPORTS AND RECREATION |
| HOBBIES |

Sample sub Text Block Group Matching Formula 1

If (more than a defined percentage of Sub Text Blocks Groups match other Sub Text Blocks Groups)

Then, the Text Block is a match for the Text Block Group.

In addition formulas are applied to identify word clusters within a text block group to identify common groups of words within the text of each member of the text block group. These clusters are then used in the same manner as the children in the example above. These clusters can also be used to highlight the important text in a text block for an end user and, conversely identify Proper nouns, specific document items, etc.

(iv) Relationship Formulas and Scores

Additional intelligence rules analyze familial relationships across the entire text block group set and determine the best location, level and sequence of each data profile. Familial relationships across the entire text block group set apply formulas to cross-check profiles to look for additional commonalities, deficiencies, and other information.

Identify Text Block Groups and Sub Text Block Groups: The data profiles characteristics of parent, siblings and children are applied in rules and formulas to identify text block groups with similar characteristics. For example, two text block groups sharing the same parent and common children can be detected by a formula.

Identify Alternative Locations: In a given document, the same or similar sections (text blocks) may appear in different locations or in a different sequence in other documents. For example, text block group 1 has a depth level of 2; while text block group 2 has depth-level of 4 and it not a descent of block group 1. A formula can detect that these two have very similar profiles and in any individual document there will rarely, if ever, possess both text block groups. Thus, a standard representation of the document structure should not include both.

(e) Text Block-to-Text Block Group Set Comparisons

In general, this comparison applies data profile matching rules to compare text blocks that are not a part of any text block group or text blocks in new documents (documents that are not a part of the text block set data profile) to the data profiles in the selected set of text block groups matching either individual text blocks or the entire set of text blocks in the new document. The rules are based on base scores, match scores, and resolution scores with adjusted thresholds to account for the fact that the process involves a one-to-many comparison, as opposed the many-to-many comparisons used for creating text block groups.

The process of matching operates in configurable sequence and in each pass lists of matched and unmatched text blocks are maintained. First, level 1 text blocks and its direct descendents in the new document are compared to level 1 data profiles in the text block group set and its direct descents (i.e. comparing among levels and between adjacent levels). Second, each successive lower level text blocks and their direct descendents in the new document are compared lower level data profiles in the text block group set and their direct descents. Third, each successive text block level in the new document are compared each successive level in the text block group set, regardless of ancestry. Finally, any remaining unmatched text blocks in the new document is allowed to match any data profile in the text block group set.

(3) Bootstrapping—Using Data Profiles to Create and Enhance Data Profiles

This section begins with an example of creating data profiles in "untrained" mode. Once data profiles are initially created, they can be used to enhance the next creation of data profiles and allow the engine to operate in a "trained mode." Examples of this bootstrapping follows, and additional examples of bootstrapping are described in tool creation engines 2.2.1.

(a) Bootstrapping Example

Document Decomposition

Bootstrapping may be applied, for example, to the process of document decomposition. In an untrained mode, decomposition relies on lexical characteristics, such as paragraph break rules and identification of headings based on text formatting. With existing data profiles, document decomposition can more accurately decompose using the text block group profiles.

(b) Bootstrapping Example

Data Profile Creation

In a trained mode of operation, together with more accurate document decomposition, the data profile engine can re-process all documents and generate more accurate data profiles. This process can be repeated as specified by settings or by formulas that instruct the data profile engine to stop re-processing once the resulting changes are insignificant.

(c) Bootstrapping Example

Text Block Group-to-Text Block Group Comparison

In an untrained mode of operation, the process of creating text block groups is based on scorings that include potentially redundant text block groups. As a result, the relative scores matching other text block groups is less accurate or nonexistent. And because the engine lacks accurate data regarding the importance of the words in the profiles, the engine utilizes different threshold settings for an untrained mode of operation.

Text block group word profiles build statistical information determining how distinguishing the word is across all text block groups. In an untrained mode, however, the engine cannot determine the how distinguishing a word is compared to all text block groups, because the engine does not know which text block groups are redundant and therefore scores will be less accurate.

The processing flow creating text blocks groups is:
1. Create text block groups
2. Perform redundancy check:
   (a) apply file commonality rules
   (b) double check those with text block group v. text block group comparison of word profiles
3. Create text block group word profiles calculating commonality across text block groups
4. Match text blocks to text block group
5. Repeat steps 1 through 4 as many times as specified by configuration settings.

In an untrained mode, the engine may lack sufficient information to accurately perform step 2(b). In subsequent passes, or in a trained mode of operation, the engine can benefit from the distinguishing words calculation and scoring rules adjusted to reflect the greater precision. In this manner, using a trained mode of operation, the data profiles builds increasingly accurate information and more varied word examples; and thereby learns from the data.

2.2. Tool Creation Engines and Product Interfaces 2.2.1. Tool Creation Engine

Tool creation engines apply formulas to the data profiles to enhance the data profiles and to create tools for end users such as search capability and document templates. The tool creation engines' formulas create tool specific scores which can be stored back to the data profiles for use by other tool creation engines and to enhance the intelligence of the data profile engine for future processing. An example is a tool creation engine with sophisticated formulas to calculate relationships across a text block group set. The results of theses formulas are not only useful to create a tool to view a standard outline of a document set, but the results are also stored to the data profiles to add intelligence to the document classification tool.

Different data domains will share appropriate tool creation engines but may also require specialized tool creation engines.

Tool creation engines are constructed from the data profile engine and facilitate the development of a wide range of software systems for organization, research, reuse and validation of individuals of sets of files. For example, the systems can be built for analyzing a set of files and creating document templates, searching and classifying files and any part of a file, identifying exemplar or alternative sections, and validating entire files or any section of file against the standard established by a template.

2.2.2. Product Interfaces

Product interfaces combine the tools into logical product packages for a specific user domain and apply human readable interfaces to the tools created by the tool creation engines.

2.2.3. Tool Creation Engine and Product Interface Examples

Figure 9:
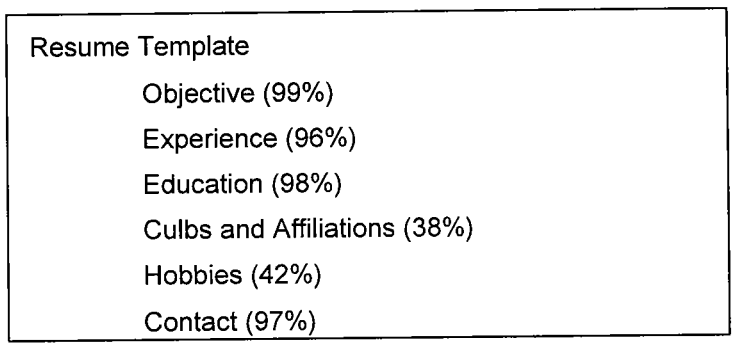
FIG. 9 depicts a standard template showing the frequency of occurrence of each section of the template.

Using the example of resume analysis discussed in the data profile engine section, a standard template, showing the frequency of occurrence of each section of the template is shown in FIG. 9 and this example is used to illustrate other Tool Creation Engines and Product Interfaces.

(1) Tools for Document Organization
  (a) Master Document Template Product Interface
  (i) Description of Master Document Templates A document template is a standardized, exemplary document structure, organizing all matching text blocks in a source set of documents and creating a single organizing framework. From an end-user perspective it is a master specification or a guiding framework capturing and organizing all distinct elements from all source documents. It can be viewed as an outline (See FIG. 2A) similar to the table of contents of a book and typically listed at the front of a publication, or an index of topical items sometimes appearing at the end of a document (See FIG. 2B).

The document template tool creation engine automates the process of defining the outline structure, identifying text examples associated with each outline element, and maintaining the structure as new standards emerge. The engine can analyze a few files or many thousands of documents. The greater the number of source documents, the more variants the engine will identify.

Figure 7:
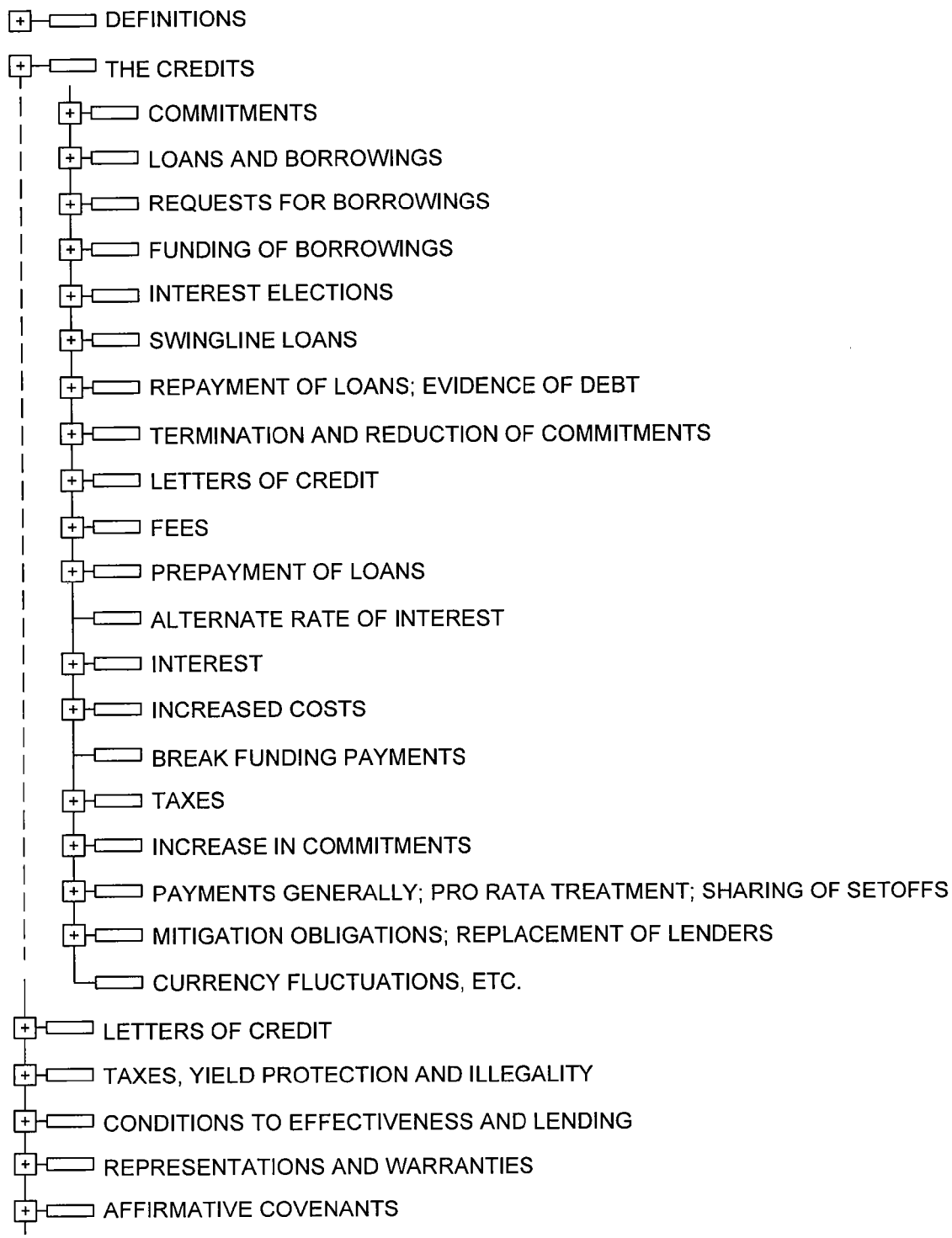
FIG. 7 depicts a template outline view provided according to certain embodiments.

The document template product interface provides an end-user interface on the results of the document template tool creation engine. FIGS. 7 and 8 show examples of a legal document template generated by the engine. In addition to displaying the structure and organization of the standardized document, information is displayed to show the frequency that each section of the outline occurs in the template. Sections occurring with high frequency may be denoted and considered as standard or even required elements; while those with a low frequency may denoted and be viewed as optional, document specific or emerging new language.

(ii) Types of Master Documents

The engine can produce different types of outlines, depending on the selection of the template generation rules.

(iii) Master Document Template

A master template aggregates all document type templates (such as model, checklist and universal templates) used in a particular professional practice area into a single comprehensive outline, such a master legal document template capturing all the discrete, matching document elements for every type of legal agreement, or a master building template containing all the design and construction requirements for every type of building project.

(iv) Model Document Template

A model template generates a standardized template for one particular type of document, such as residential home construction specification or a credit agreement. The model template serves as a best practice guideline containing standard sections (i.e. those over a stated commonality threshold) and applies mutually exclusive rules to remove redundant variants so that each topical section occurs in only one place in the Template 7.

(v) Checklist Document Template

A checklist template contains all matching clause variants and redundant variants. it is typically constructed from a large sample set of document so that the template framework contains all topical elements, together with detailed sub-elements for each section, thereby creating an outline of all items that may be considered in a particular project.

(vi) Universal Document Template

A universal template is an encyclopedia of all discrete topical variants, including infrequently occurring and unmatched sections and may be used as a reference source.

(vii) Derivative Document Template

A derivative template is a template generated from a smaller set of documents based on the template and data profiles created from a larger document collection. Derivative templates can be used where, for example, a particular organization wishes to build a model template, but lacks sufficient examples to provide a data rich set of data profiles. In this circumstance, statistical information in the primary template is used to build a derivative whose structure solely based on the smaller set of documents.

(viii) Document Decomposition

Figure 10:
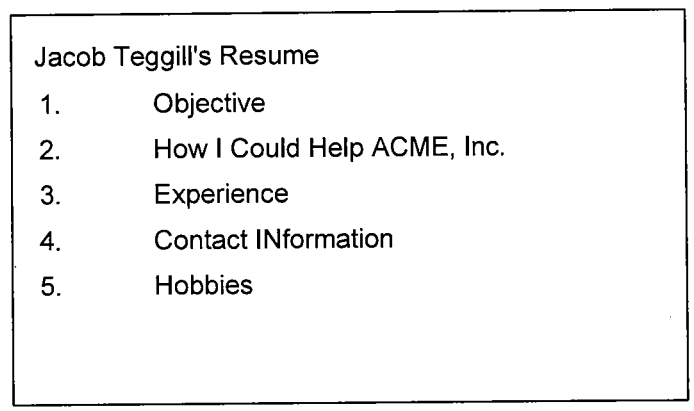
FIG. 10 depicts a text block outline structure of a document.

A new document can be decomposed into an outline structure by identifying text blocks in a new document and matching the text blocks to the selected data profiles, providing a navigation tool to link to sections in the document, whether or not the new document contains captions or numbered sections, as shown in FIG. 10.

(b) Master Document Template Tool Creation Engine

Using the data profiles, the document template tool creation engine automates the process of defining the outline structure, identifying text examples associated with each outline element, and maintaining the structure as new standards emerge. The engine can analyze a few files or many thousands of documents. The greater the number of source documents, the more variants the engine will identify.

Each of the functions requires a tool creation engine to analyze and create the data necessary for the product interface.

(2) Tools for Document Research (a) Text Search

A Search "Tool Creation Engine" is a set of formulas that use the data profiles to match text to text block groups in order to create a search tool that can be used in an end-user product interface.

For example, if the desired search tool is a text box in which the user can enter a textual query and receive a list of the top text block group matches, it may apply the following sets of formulas:

The end user entered text would be treated as a Text Block and can be scored by formulas such as those previously discussed The Text Block could now be compared to all of the Text Block Group Data Profiles as discussed earlier or with new rules and formulas The resulting match list may be sorted by formulas similar to those previously discussed.

More advanced search tools can be created by utilizing more of the information in the data profiles such as specifying which text block groups should be used (b) Document and Section Search A document search "tool creation engine" can find entire documents by analyzing the structure and contents of an example document compared to text block group sets and their data profiles. Topical sections of documents can be located based on a selected section or fragment of text by comparison to the data profile in user selected or automatically identified templates. In addition, the engine facilitates word searching for captions and text content.

(c) Document and Section Classification

A new document in its entirety is classified by comparing its structure and contents to document type text block group sets by applying data profile matching rules. Topical sections of new document are classified by comparison to program-selected (or user selected) text block group sets and its associated data profiles.

For example, a tool creation engine can be created to analyze data profiles, word commonality and divergence between various text block group sets and store findings to the data profiles. The data profile engine may thereafter use this information to classify documents to specific text block group sets. For example, the existence and frequency of a few words and the lack of a few other words indicate this document is a resume.

(3) Tools for Document Drafting and Reuse (a) Identification of Alternative Clauses The document and section search tools are applied to find alternative examples of particular sections with the need for explicit search techniques. Users can select a particular section and the words in the section are used as a search pattern to identify and find alternative example. The search result set can be ordered in sequence of conformity to the data profile or grouped by clustering the result set of sections based on the attributes of the alternative sections.

(b) Identification of Default Clauses

In addition, the tool creation engine can identify an exemplar section as the alternative most closely matching the data profile.

(c) Document Outline Display

The tool creation engine may also be used to display the outline of a document, such as a resume, and provide other functionality. For example, Formulas may be constructed to utilize the data profile information to produce the following:

Determine the Subject of the Resume: by defining formulas to analyze word frequency, location and order of words in each text block group of words compared to the data profile and the word universe, the tool creation engine can identify the subject of the resume as "Jacob Tegill's" resume.

Display and Outline of the Document: The outline of the document is built from the matching text block groups.

Display a Caption for each Text Block Group: The caption for each text block is drawn from sub-text block groups.

Provide Hypertext-like Navigation Links: Each caption heading can be defined as a link to specified section in the document using the file offset stored in the text blocks.

| Jacob Teggill's Resume |
|---|
| 1. Objective |
| 2. How I Could Help ACME, Inc. |
| 3. Experience |
| 4. Contact Information |
| 5. Hobbies |

(4) Tools for Document Validation and Analysis (a) Document Benchmarking

Entire documents and text sections are benchmarked to a selected text block group set by comparison to the data profiles in the text block group sets. Benchmarking identifies matching text blocks, displays the frequency that each text block occurs in the text block group sets, the consistency of the language in each text block in a document compared to the data profiles in the text block group sets, and any text blocks occurring with high frequency in the text block group set that are missing from the benchmarked document.

| Jacob Teggill's Resume |
|---|
| 1. Objective (99%) |
| 2. How I Could Help ACME, Inc. |
| 3. Experience (96%) |
| 4. [Education] (98%) |
| 5. Contact Information (97%) |
| 6. Hobbies (42%) |
| 7. [Clubs and Affiliations] (38%) |

In the resume example, the tool creation engine analyzes the data profiles so that the product interface can provide feedback to the user identifying:

The section entitled "How I Could Help ACME, Inc." is not a common section in a Resume.

The section titled "Contact Information" is typically, named "Contact."

The Hobbies section typically comes before CONTACTS

A Section titled "Education" is missing and is very frequent in most resumes

A section titled "Clubs and Affiliations" present, but may optionally be added.

(b) Document Standardization

In addition to provide a benchmarking report, the tool creation engine can propose changes be made to a specific document. Applying sequencing formulas and sub-text block caption formulas, the system can automatically re-order the sequence of the "Hobbies" section and rename the "Contact Information" section to "Contacts."

(c) Language Conformity

In addition to analysis occurrence and frequency of text blocks compared to the data profiles, the tool creation engine can analyze the degree of consistency of the language used in each section of the new document compared to the data profiles. The analysis applies matching formulas to validate the present of sub-text blocks, common words, words pairs and word clusters. In the same manner as document benchmarking, the validation feed back can identify conforming language non-conforming language, and missing language.

| Jacob Teggill's Resume |
|---|
| 1. Objective (38%) |
| 2. How I Could Help ACME, Inc. |
| 3. Experience (74%) |
| 4. Contact Information (65%) |
| 5. Hobbies (51%) |

In the resume example, the sections entitled "Objective" while matching the location and sequence of the Text Block in the Data Profiles shows little conformity of the language used compared to the Data Profile and is therefore highlighted.

(d) Key Language Identification and Mark-Up

Typically text processing techniques for meta-data extraction operate using rule-based techniques to capture titles, headings, names, places and dates. The data profiles facilitates a tool creation engine that uses the statistical information in the word universe and the data profiles to identify words and words clusters appearing in a document with much higher frequency than in the word universe. Words appearing frequently in a particular file, but having a lower commonality score in the word universe are typically document specific data, such as names of people, companies, amounts and dates and other information specific to the document being analyzed.

By constructing data profiles, the engine provides a new method of data mining and identifying document specific information. By comparing the statistical information in the word universe to the data profiles, formulas identify words and word clusters appearing with higher frequency in a document compared to the universe. For example a company name may appear frequently in a particular document, but is rare in the universe.

Key data identification formulas identify document specific language, proper nouns, dates, and amounts.

Text Block 1

HOBBIES: In his leisure time, <u>Jacob Teggill</u> enjoys the activities of *Archery and Baseball* and often relaxes by *drawing or reading a book*.

Text Block 2

HOBBIES: <u>Jack's</u> leisure activities include riding *horses, skating*, and spending time with his family.

In the example, bolded text represents common words and word clusters in the text block group profiles. Italicized words are more common in this text block group than in the word universe. Underlined words are very uncommon in the word universe, but they appear unusually frequently in a particular document and are likely key entities or subject matter topics in the document. Combining the key data identification rules with other known attributes of data profiles offers faster and more accurate data mining compared to existing rules based approaches.

Use Cases (Examples from Law and Architecture)

A document research engine identifies the best matching model document for a new drafting project. For example, a lawyer may use the tool to identifying a particular existing loan agreement closely matching a reference standard from the lawyer's personal collection of documents, a law firm's collection, or a public collection to be used as a starting point for a new drafting assignment. An architect may use the tool to retrieve a construction specification for a particular type of building project from the architect's archives.

A document deconstruction and navigation tool summarizes the provisions in a file and create an outline and index of all sections in a file and a method to hypertext link to each section. A lawyer reviewing a lengthy loan agreement, for example, may use the tool to create a outline of a file showing listing all its articles, clauses and sub-sections and use the index to find and display each section.

A document analysis engine benchmarks an existing document against a reference standard for commonality and consistency. For example, a lawyer may use the tool to analyze a document drafted by another lawyer or another law firm to determine how the new document matches a reference standard to access whether the clauses in the new document are frequently used standard clauses, whether they are uncommon, whether any standard clauses are missing, whether any clause is not located in the standard place in the document, whether the language of each clause matches the reference standard, is missing any standard language or includes deal-specific language. An architect may use the tool to analyze a building specification to ensure it is complete, contains standard building specifications, is not missing any standard specifications, and that the language of each specification meets the building code guidelines.

A document drafting tool identifies default standard clauses, alternative clauses and infrequently used clauses. A lawyer, for example, reviewing a loan agreement may identify non-consistent clauses uses the tool and replace the clause or selected text in the clause with a standard or default clause or use the engine to display alternative clauses (grouped by conformity to the reference set of clauses or grouped by reference to the selected clause in the loan agreement), or use the engine to display infrequently used clauses. An architect reviewing a building specification for a new home construction may identify non-standard building specifications and use the tool to find and replace such non-standard specifications with the standard building specification and review alternative specifications.

A document analysis engine highlights standard terms in a document or section of document showing standard language and non-standard language. A lawyer, for example, may select a particular clause in a loan agreement and highlight and distinguish the standard language of the clause, the deal-specific language and key deal terms (such a party names, jurisdictions, dates, amounts etc.).

A document validation engine ensures that a document satisfies the market standard. Upon completion if a drafting assignment, a lawyer or architect may use the tool to ensure that the document is complete, contains all required clauses or specifications, and that the language of each clause contains all required terms.

The methods according to the present invention are implemented using computer methods. In some implementations, various combinations of software and hardware may be used, as would be apparent to those of skill in the art and as desired by the user. In addition, the present invention may be implemented in conjunction with a general purpose or dedicated computer system having processor, memory and display components, which may be communicatively coupled on an internal or external network (e.g., the World Wide Web/Internet) to other computing systems including databases.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

Exhibit 1—Word Universe Sample

Column Headings
Number of Files Containing the Word|Number of Paragraphs Containing the Words|Is Numeric|Is Numeric Long|Is Roman|Is Repeated Alpha|Is a Stop Word|Word (uppercase)|Occurrences of Word Divided by Count of All Words in Universe|Total Occurrences of Word in All Files|Percent of Files Containing the Word

|26|6|-72|F|F|F|F|F|SECURITY|.00|89||387894|.7756|
|6|75|-72|F|F|F|F|F|T|AND|.03186|6534186|.9944|
|2238|-72|F|F|FIF|F|EXCHANGE|.001425|292348|.7524|
|9117|-72|F|F|FIF|F||COMMISSION|.0002810|57621|.5605|
|2757|-72|F|F|F|F|F|WASHINGTON|.0000803|16484|1695|
|2095|-72IFIF|F|F|F|D|.001033|211918|.7436|
|3078I-72IFIF|F|F|F|C|.001788|366669|.8040|
|1635|-72|F|F|F|F|F|FORM|.0009039|85346|.7153|
|8120|-72|F|F|FIF|K|.0002793|57270|.4992|
|8140|-72|F|F|FIF||CURRENT|.0004467|91610|.5004|
|8773|-72|FIF|F|F|F|REPORT|.00067431|38267|.5393|
|3472|-72|F|F|F|F|F|PURSUANT|.001745|357984|.8282|
|6121F|F|F|F|F|TO|.03209|6580140|.9911|
|3407|-72|F|F|F|F|F|SECTION|.006385|1309340|.8242|
|5531|-72|F|F|F|F|T|OR|.03504|7185544|.9548|
|6245|-72|F|F|F|T|OF|.05257|10779832|.9987|
|6169|-72|F|F|F|T|THE|.07207|14778164|.9940|
|2487|-72|F|F|F|F|ACT|.01|374|2818271.7677|
|4038|-72|F|F|F|F|DATE|.003316|680003|.8630|
|2505|-72|F|F|F|F|F|EARLIEST|.0000162|3340|.1540|
|1422-72|F|F|F|F|F|EVENT|.0009440|193567|.7022|
|4857|-72|F|F|F|F|F|REPORTED|.0000926|19005|.2986|
|4626|-72F|F|F|F|F|FJULY|.0001225|25132|.2844|
|3269|-72|F|F|F|F|INC|.0008039|164844|.8158|
|938|-72|F|F|F|F|F|EXACT|.0000060281|1236|.05766|
|2207|-72F|F|F|F|F|NAME|.0004065|83367|.7505|
|1677|-72|FF|F|F|F|REGISTRANT|.0000602|12362|.|131|
|5848|-72|F F|F|F|FAS|.009584|1965168|.9743|
|9045|-72F|F|F|F|F|SPECIFIED|.0002769|56778|.5561|
|5786|-72|F|F|F|T|IN|.02043|4189776|.9705|
|4834|-72F|F|F|F|F|FIT|.007299|1496615|.9120|
|5079|-72|F|F|F|F|F|CHARTER|.0001317|27013|.3122|
|9391|-72}F|F|F|F|FDELAWARE|.0004659|95543|.5773|
|2418|-72|F|F|F|F|F|STATE|.001025|210221|.7634|
|4894|-72|F|F|F|F|F|OTHER|.006931|142130|1.9157|
|9112|-72|F|F|F|F|F|JURISDICTION|.0004192|85961|.5602|
|3856|-72|F|F|F|F|F|IR|.0000819|16803|.2370|
|4536|-72|F|F|F|F|EMPLOYER|.0000896|18387|.2788|
|9482|-72|F|F|F|F|F|INCORPORATION|.0004986|102248|.5829|
|8438|-72F|F|F|F|F|FILE|.0002192|44961|.5187|
|1427|-72|F|F|F|F|F|NUMBER|.0007448|152724|.7025|
|1942|-72|F|F|F|F|IDENTIFICATION|.0000183|3760|.1193|
|3658|-72|F|F|F|F|F|NO|.002805|5753301|.8397|
|2947|-7|FIF|F|F|F|DRIVE|.0000309|6348|.1811|
|20|-72|FIF|F|F|F|DEWITT|.000000170|35|.001229|

Exhibit 4—Pseudo Code for Text Block-to-Text Block Group Matching

Each unmatched Text Block is compared to all Data Profiles to determine its location, if any, in the Data Profile Template. The general process of matching is described in section 2.1.2 (2)(c).

Use case: generate list of Text Block Groups to a user for a selected block of text.

Section Matching

1. Determine what processing instructions to use
       a. Apply section match rules (See Exhibit 3)
    2. Create list of all Text Block Groups to compare against this Text Block 3. Run comparisons
   a. Caption and text broken in words; scored against the Word Universe and Text Block Groups
      i. For each caption word and each text word:
         Step 1: calculate the word weights applying the formula:
         Where the percentage of files in which the word occurs is greater than 70%, the word weight assigned is 0.1
         Where the percentage of files in which the word occurs is greater than 10% and less than 70%, the word weight assigned is 1.0
         Where the percentage of files in which the word occurs is greater than 0.01% and less than 10%, the word weight assigned is 0.5
         Where the percentage of files in which the word occurs is greater than 0.01%, the word weight assigned is 0.0
         Step 2: calculate word commonality in the Text Block Groups:
         Data Profile scores for each Text Block Group were calculated using the formulas.
         Word Weights=Word Universe Word Weight Number of files containing the word
         Percentage of files containing the words=(Score 1/Number of Files)*100
         Number of different Text Block Groups containing the words
         Percentage of Text Block Groups containing the Text Block Common Words=(Score 45/Number of Text Block Groups)*100
         Distinguishing Word Factor=Inverse Factor(1−Score 5)$^2$
         [2] The Inverse Factor is computed because it weights words that appear less frequently across the Text lock Groups
         Step 3: Word Weight: universe word weight (step 1) multiplied by Text Block Group Word Weight (Step 2)
         (ii |Sum all word weights in the Text Block
   b. Apply matching rules to compare to each Text Block Group
      i. For each Text Block Group:
         1. Compare caption in Text Block to each caption in the Text Block Group applying the Configuration Settings (see Exhibit 2):
            Divide sum of all Text Block Word Weights for matching words by the sum all Word Weights in the Text Block's caption (score 1)
            Divide sum of all Text Block Group Word Weights for matching words by the sum all Word Weights in the Text Block Group's caption (score 2)
         2. Compare text in the Text Block to text in the Text Block Group word profiles applying the Configuration Settings (see Exhibit 2):
            First calculate score with all words in the Text Block
            Divide sum of all Text Block Word Weights for matching words by the sum all Word Weights in the Text Block (score 3)
            Divide sum of all Text Block Group Word Weights for matching words by the sum all Word Weights in the Text Block Group (score 4)
            Second calculate score with leading words (determined by Configuration Settings) in the Text Block as compared to the Text Block Group word profile
            Divide sum of all Text Block Word Weights for matching leading words by the sum all leading Word Weights in the Text Block (score 5)
            Divide sum of all Text Block Group Word Weights for matching leading words by the sum all Word Weights in the Text Block Group (score 6)
            Third calculate score with leading words (determined by Configuration Settings) in the Text Block as compared to the Text Block Group caption word profile
            Divide sum of all Text Block Group Word Weights for matching caption words by the sum all Word Weights in the Text Block Group caption (score 7)
            Fourth calculate length ratio of the Text Block compared to Text Block Group
            Calculate count of all unique words in the Block (Score 8)
            Calculate average count of all unique words of all Text Blocks in the Text Block Group (Score 9)
            Calculate ratio by divided the greater of Score 8 or Score 9 by the lesser of Score 8 or Score 9
      3. Generate scores for the match of the Text Block to the Text Block Group (applying Configuration Settings (see Exhibit 2) and Matching Rule Sets (see Exhibit 3)) using the Scores from 3(b)(1) and 3(b)(2).
   c. Apply rules to determine the sort order from best to worst match (applying Configuration Settings (see Exhibit 2))
      i. Sort list Text Block match precision scores generated by Step 3(b)(3)
      ii. Resort list based in rules in the Configuration Settings based on each score generated in Step 3(b). For example, if the match precision scores of two Text Block Groups is very close, reorder the two Text Block Groups based on their length ratio.
      iii. Determine if one or more Text Block Groups matches with sufficient accuracy to be considered a complete match
4. Apply Tool Creation Engine to analyze comparison results and apply rules
   a. Generate list of results and display Text Blocks meeting a threshold match level

What is claimed is:

1. A method for identifying relationships among a plurality of data files comprising word text, the method comprising:
   receiving at a processor the plurality of data files from one or more databases;
   generating a word universe comprising word frequencies, word weights, and statistical information from words in the plurality of files;
   deconstructing the data files into a plurality of text blocks;
   building a statistical signature for each of the plurality of text blocks, the statistical signature indicating lexical characteristics of the corresponding text block compared to the word universe;
   grouping text blocks sharing common statistical signatures into text block groups;
   storing the common statistical signatures as data profiles for the text block groups in a database; and
   building a data profile for each data file by measuring word commonality, mean and divergence among the words in each data file compared to the word universe and relationships among text blocks and text block groups.

2. The method of claim 1, wherein the method further comprises comparing the data profiles of the text blocks within each data file and across the plurality of data files to form a plurality of text block groups.

3. The method of claim 2, wherein the method further comprises:
matching the data profiles for the plurality of text block groups to form a plurality of text block group sets; and
building a data profile for each of the plurality of text block group sets.

4. The method of claim 3, wherein the method further comprises successively refining the data profile for each text block, text block group, and text block group set by applying the data profile for each of the text blocks, text block groups, and text block group sets to other text blocks, text block groups, and text block group sets.

5. The method of claim 1, wherein building the data profile further comprises calculating a base score for each text block according to a word weight sum, the word weight sum calculated based on a statistical frequency of each word in the text block compared to the word universe.

6. The method of claim 5, wherein the method further comprises:
matching the text blocks within each data file and across the plurality of data files by comparing the base scores for the text blocks to form a plurality of text block groups; and
building a data profile for each of the plurality of text block groups, the data profile comprising word characteristics and common statistical signatures of the text blocks in each text block group.

7. The method of claim 6, wherein the data profile for a text block group comprises hierarchical relationships among text blocks and text block groups.

8. The method of claim 6, wherein the method further comprises:
matching the data profiles for the plurality of text block groups to form a plurality of text block group sets; and
building a data profile for each of the plurality of text block group sets.

9. The method of claim 8, wherein the method further comprises successively refining the data profile for each text block, text block group, and text block group set by applying the data profile for each of the text blocks, text block groups, and text block group sets to other text blocks, text block groups, and text block group sets.

10. The method of claim 1, wherein deconstructing the data files comprises analyzing lexical characteristics of the text in the data file including identifying paragraph breaks and headings based on text formatting and using information in the data profiles to identify text block delimitation.

11. A system for analyzing a document comprising text, the system comprising:
a processor configured to receive the document and perform the steps of:
deconstructing the document into a plurality of text blocks;
building a data profile for each of the plurality of text blocks, each data profile comprising a statistical signature indicating lexical characteristics of the corresponding text block compared to a word universe comprising word frequencies, word weights, and statistical information generated from words in a set of reference documents; and
comparing the data profile for each of the text blocks with a template comprising data profiles for matching text blocks from the set of reference documents; and
a user interface coupled to the processor for:
displaying an indication of similarity of the document compared to the template, the indication of similarity comprising statistics of matching text blocks, and
displaying an indication of divergence of the document compared to the template, the indication of divergence comprising a list of text blocks missing from the document.

12. The system of claim 11, wherein the statistics of matching text blocks comprises a measure of language commonality.

13. The system of claim 11, wherein the statistics of matching text blocks comprises a measure of language conformity.

14. The system of claim 11, wherein the indication of divergence further comprises a measure of language variance between matching text blocks.

15. A system for preparing a document comprising text, the system comprising:
a processor configured to receive the document and perform the steps of:
deconstructing the received document into a plurality of text blocks;
building a data profile for each of the plurality of text blocks, each data profile comprising a statistical signature indicating lexical characteristics of the corresponding text block compared to a word universe comprising word frequencies, word weights, and statistical information generated from words in a set of reference documents;
building a data profile for each of a set of model documents by measuring word commonality, mean and divergence among the words in each model documents compared to the word universe and relationships among text blocks; and
comparing the data profile for each of the text blocks to data profiles associated with a model document, the model document comprising a plurality of statistically similar text blocks from the set of model documents; and
a user interface coupled to the processor for displaying default standard clauses, alternative clauses and infrequently used clauses based on the set of model documents.

16. The system of claim 15, wherein the processor is further configured to generate a prototypical model document providing the standard clauses, the alternative clauses and the infrequently used clauses in a redline format.

17. The system of claim 15, wherein the processor is further configured to refine the model document and its associated data profiles based on the received document.

18. The system of claim 15, wherein the processor is further configured to identify a first text block from the set of model documents, whereby the data profile of the first text block matches the data profile for each of the plurality of text blocks from the received document.

19. The system of claim 18, wherein the processor is further configured to identify a second text blocks from the set of model documents, whereby the data profile of the second text block matches the data profile for each of the plurality of text blocks from the received document.

20. A system for searching documents, the system comprising:
a processor configured to receive a plurality of reference documents and perform the steps of:
generating a word universe comprising word frequencies, word weights, and statistical information from words in the plurality of reference documents;

deconstructing the reference documents into a plurality of text blocks;

building a data profile for each of the plurality of text blocks, each data profile comprising a statistical signature indicating lexical characteristics of the text block compared to the word universe;

building a data profile for each of the plurality of reference documents by measuring word commonality, mean and divergence among the words in each reference document compared to the word universe and relationships among the data profiles of the plurality of text blocks; and searching for a model document from the reference documents, the model document's data profile matching one or more data profiles associated with a user document;

a user interface coupled to the processor for entering a search, the search comprising terms, section captions and/or one or more text sections of the user document; and a display for displaying the search results.

21. The system of claim 20, wherein searching for the model document comprises:

using one or more sections of the user document as a search; and finding a model file from the reference documents with one or more matching data profiles by comparing the data profiles associated with the one or more sections of the user document to data profiles of the plurality of text blocks.

22. The system of claim 20, wherein the processor is further configured to categorize the user document by matching data profiles associated with one or more sections of the user document to data profiles of the plurality of text blocks.

23. The system of claim 20, wherein the processor is further configured to identify section topics of the user document by:

deconstructing the user document into a plurality of sections;

building a data profile for each of the plurality of sections; and comparing the data profiles for the plurality of sections to the data profiles of the plurality of text blocks.

\* \* \* \* \*